United States Patent
Yoshii

(10) Patent No.: US 11,776,491 B2
(45) Date of Patent: Oct. 3, 2023

(54) DISPLAY CONTROL DEVICE, IMAGE DISPLAY DEVICE, DISPLAY CONTROL METHOD, AND RECORDING MEDIUM TO CONTROL A LIGHT EMISSION AMOUNT OF A REGION BASED ON A LIGHT SOURCE CONTROL VALUE FOR THE REGION

(71) Applicant: Mitsubishi Electric Corporation, Tokyo (JP)

(72) Inventor: Hideki Yoshii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 83 days.

(21) Appl. No.: 17/438,474

(22) PCT Filed: Mar. 18, 2019

(86) PCT No.: PCT/JP2019/011059
§ 371 (c)(1),
(2) Date: Sep. 13, 2021

(87) PCT Pub. No.: WO2020/188674
PCT Pub. Date: Sep. 24, 2020

(65) Prior Publication Data
US 2022/0148527 A1 May 12, 2022

(51) Int. Cl.
*G09G 3/34* (2006.01)
*G06T 7/90* (2017.01)
(Continued)

(52) U.S. Cl.
CPC ............ *G09G 3/3413* (2013.01); *G06T 7/70* (2017.01); *G06T 7/90* (2017.01); *G06V 10/60* (2022.01);
(Continued)

(58) Field of Classification Search
CPC ......... G09G 3/2003; G09G 3/2092–22; G09G 3/34–3426; G09G 3/36; G09G 3/3607;
(Continued)

(56) References Cited

U.S. PATENT DOCUMENTS

| 2011/0169795 A1 | 7/2011 | Kondoh et al. |
| 2012/0299979 A1 | 11/2012 | Murai et al. |

(Continued)

FOREIGN PATENT DOCUMENTS

| JP | 2007-322945 A | 12/2007 |
| JP | 2010-72361 A | 4/2010 |

(Continued)

OTHER PUBLICATIONS

International Search Report and Written Opinion dated Jun. 11, 2019, received for PCT Application PCT/JP2019/011059, Filed on Mar. 18, 2019, 7 pages including English Translation.

*Primary Examiner* — Keith L Crawley
(74) *Attorney, Agent, or Firm* — XSENSUS LLP

(57) ABSTRACT

In an image display device including a backlight (6) divided into multiple regions, color shift information (CSR, CSB) is generated from a light source control value (BL(i,j)) for each region, the region to which a pixel of interest belongs and regions therearound are taken as reference regions, luminance conversion information is generated from the light source control value for each reference region, color conversion information is generated from the color shift information for each reference region, and an image signal is converted based on the color conversion information and luminance conversion information, so that an output image signal is generated. Even when there is light leakage from a peripheral region, it is possible to perform color correction so that the color difference is not noticeable at a region boundary portion.

20 Claims, 17 Drawing Sheets

(51) Int. Cl.
*G06T 7/70* (2017.01)
*G06V 10/60* (2022.01)
*G09G 3/36* (2006.01)

(52) U.S. Cl.
CPC ............. *G09G 3/3426* (2013.01); *G09G 3/36* (2013.01); *G06T 2207/10024* (2013.01); *G09G 2320/0242* (2013.01); *G09G 2320/0646* (2013.01); *G09G 2320/0686* (2013.01)

(58) Field of Classification Search
CPC .. G09G 3/3644; G09G 3/3666; G09G 3/3696; G09G 5/02–06; G09G 2310/0237–024; G09G 2320/0242; G09G 2320/0271–0276; G09G 2320/0285; G09G 2320/0646; G09G 2320/0666; G09G 2320/0673; G09G 2320/0686; G09G 2340/06; G09G 2360/16; G06T 7/70; G06T 7/90; G06V 10/60
See application file for complete search history.

(56) References Cited

U.S. PATENT DOCUMENTS

| | | | |
|---|---|---|---|
| 2013/0016141 A1* | 1/2013 | Chang | G09G 3/3611 345/694 |
| 2016/0117993 A1* | 4/2016 | Buckley | G09G 3/3426 345/694 |
| 2016/0210912 A1 | 7/2016 | Tada | |
| 2016/0335958 A1* | 11/2016 | Huang | G02F 1/133621 |
| 2017/0018231 A1* | 1/2017 | Liu | G09G 3/3426 |
| 2019/0355316 A1* | 11/2019 | Ji | G09G 3/36 |
| 2020/0271993 A1* | 8/2020 | Lim | G02F 1/133602 |

FOREIGN PATENT DOCUMENTS

| | | |
|---|---|---|
| JP | 2016-133640 A | 7/2016 |
| WO | 2011/104952 A1 | 9/2011 |

* cited by examiner

| A(1,1) | A(2,1) | A(3,1) | A(4,1) | A(5,1) | A(6,1) | A(7,1) | A(8,1) |
| --- | --- | --- | --- | --- | --- | --- | --- |
| A(1,2) | A(2,2) | A(3,2) | A(4,2) | A(5,2) | A(6,2) | A(7,2) | A(8,2) |
| A(1,3) | A(2,3) | A(3,3) | A(4,3) | A(5,3) | A(6,3) | A(7,3) | A(8,3) |
| A(1,4) | A(2,4) | A(3,4) | A(4,4) | A(5,4) | A(6,4) | A(7,4) | A(8,4) |
| A(1,5) | A(2,5) | A(3,5) | A(4,5) | A(5,5) | A(6,5) | A(7,5) | A(8,5) |
| A(1,6) | A(2,6) | A(3,6) | A(4,6) | A(5,6) | A(6,6) | A(7,6) | A(8,6) |

FIG. 7

| u   | HWEIGHT (u)   |
|-----|---------------|
| 0   | HWEIGHT (0)   |
| 1   | HWEIGHT (1)   |
| 2   | HWEIGHT (2)   |
| 3   | HWEIGHT (3)   |
| ... | ...           |
| 299 | HWEIGHT (299) |

FIG. 8

| A(i-2, j-2) | A(i-1, j-2) | A(i, j-2) | A(i+1, j-2) | A(i+2, j-2) |
|-------------|-------------|-----------|-------------|-------------|
| A(i-2, j-1) | A(i-1, j-1) | A(i, j-1) | A(i+1, j-1) | A(i+2, j-1) |
| A(i-2, j)   | A(i-1, j)   | A(i, j)   | A(i+1, j)   | A(i+2, j)   |
| A(i-2, j+1) | A(i-1, j+1) | A(i, j+1) | A(i+1, j+1) | A(i+2, j+1) |
| A(i-2, j+2) | A(i-1, j+2) | A(i, j+2) | A(i+1, j+2) | A(i+2, j+2) |

FIG. 17

| u | HWEIGHT (u) |
|---|---|
| 0 | HWEIGHT (0) |
| 4 | HWEIGHT (4) |
| 8 | HWEIGHT (8) |
| 12 | HWEIGHT (12) |
| ... | ... |
| 296 | HWEIGHT (296) |

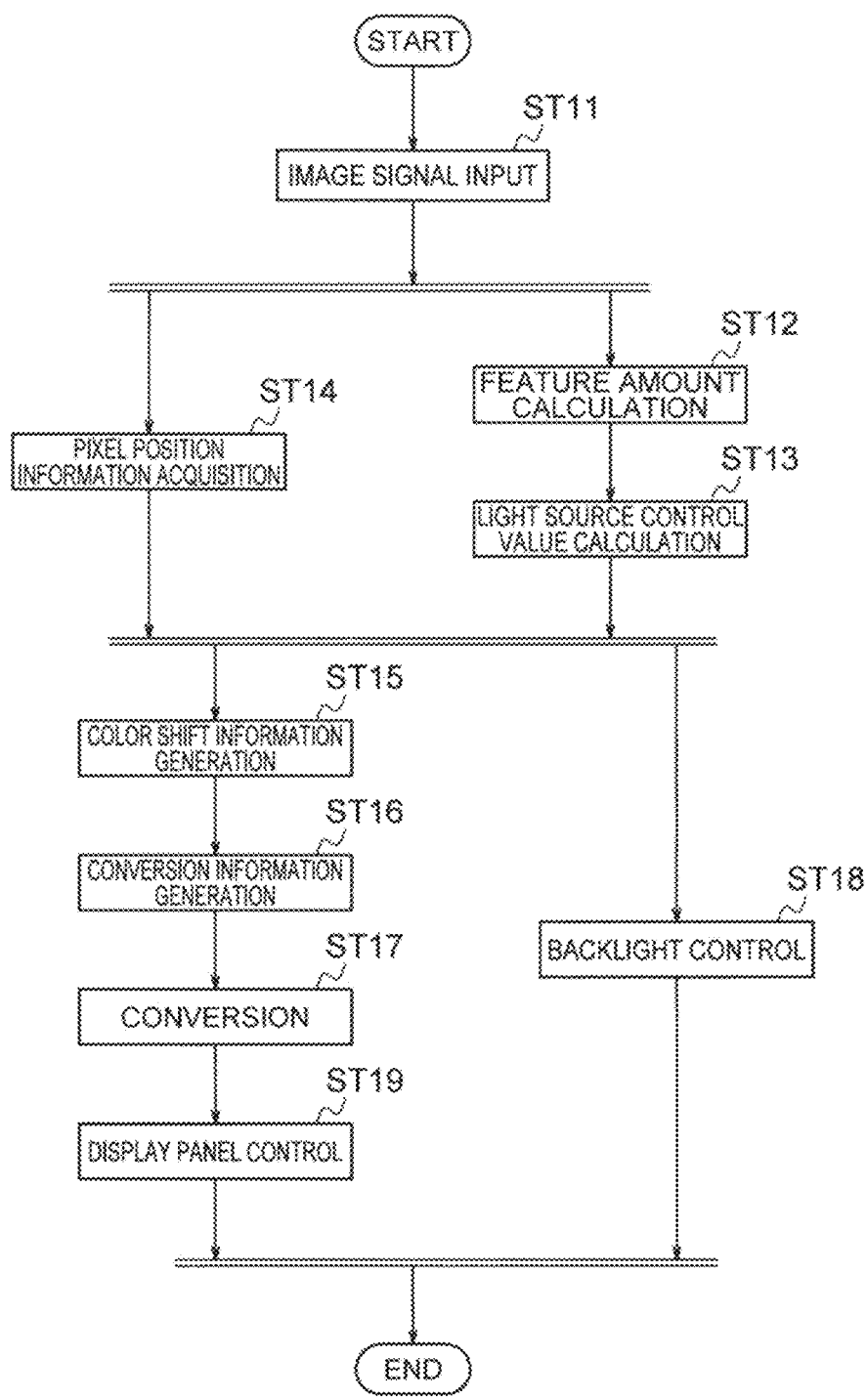

DISPLAY CONTROL DEVICE, IMAGE DISPLAY DEVICE, DISPLAY CONTROL METHOD, AND RECORDING MEDIUM TO CONTROL A LIGHT EMISSION AMOUNT OF A REGION BASED ON A LIGHT SOURCE CONTROL VALUE FOR THE REGION

CROSS-REFERENCE TO RELATED APPLICATION

The present application is based on PCT filing PCT/JP2019/011059, filed Mar. 18, 2019, the entire contents of which are incorporated herein by reference.

TECHNICAL FIELD

The present invention relates to a display control device, an image display device, and a display control method. The present invention also relates to a program and a recording medium.

BACKGROUND ART

In image display devices, such as liquid crystal displays, including backlights, mainly for the purpose of contrast enhancement and power consumption reduction, there has been used a technique called local dimming that divides a backlight into multiple regions and controls the amount of light emitted from the backlight for each region.

The backlight may slightly change in color with a change in the light emission amount, due to characteristics of light emitting elements. When the backlight is controlled uniformly over the entire surface, the color change is less likely to be perceived. However, when the light emission amount of the backlight is made different between regions, the color difference between the regions may be perceived, which is undesirable.

To solve this problem, it has been proposed to adjust the light transmittance of an LCD panel to compensate for changes in color (hue) of light emitted from a backlight (see, e.g., Patent Literature 1).

CITATION LIST

Patent Literature

Patent Literature 1: International Publication No. 2011/104952 (paragraph 0036)

SUMMARY OF INVENTION

Technical Problem

However, light leaks into each region of the backlight from its peripheral regions, and in the conventional device, changes in color of the emitted light may be insufficiently compensated for.

The present invention has been made to solve the above problem, and is intended to provide a display control device capable of, in an image display device in which the brightness of a backlight is controlled for each region, even when there is light leakage from a peripheral region, performing color correction so that the color difference is not noticeable at a region boundary portion.

Solution to Problem

A display control device of the present invention is a display control device of an image display device that includes a display panel to display an image by changing a transmittance at each pixel position and a backlight including a plurality of regions, and generates and outputs an output image signal by performing color conversion and luminance conversion on an input image signal while sequentially taking, as a pixel of interest, a plurality of pixels constituting an image represented by the input image signal, the display control device including:
a feature amount calculator to calculate, from the input image signal, a feature amount for each of the plurality of regions;
a light source control value calculator to calculate, from the feature amount for each of the plurality of regions, a light source control value for each of the plurality of regions;
a color shift information generator to generate, for each of the regions, color shift information for the region on a basis of the light source control value for the region;
a pixel position information acquisition unit to acquire, from the input image signal, pixel position information for the pixel of interest;
a conversion information generator to generate luminance conversion information for the pixel of interest, with a region to which the pixel of interest belongs and regions therearound as a plurality of reference regions, from the light source control value for each of the plurality of reference regions and the pixel position information for the pixel of interest, and generate color conversion information for the pixel of interest from the color shift information for each of the plurality of reference regions and the pixel position information for the pixel of interest; and
a converter to convert, on a basis of the color conversion information and the luminance conversion information for the pixel of interest, a color and a luminance of the input image signal for the pixel of interest to generate the output image signal for the pixel of interest,
wherein the display control device
controls, for each of the plurality of regions, a light emission amount of the region on a basis of the light source control value for the region, and
controls a transmittance at a position of the pixel of interest of the display panel by using the output image signal for the pixel of interest.

Advantageous Effects of Invention

With the present invention, even when there is light leakage from a peripheral region, it is possible to perform color correction so that the color difference is not noticeable at a region boundary portion.

BRIEF DESCRIPTION OF DRAWINGS

FIG. 7 is a table illustrating an example of a part representing a distribution in a horizontal direction of the light distribution table used in the first embodiment.

FIG. 8 is a diagram illustrating peripheral regions referred to in generation of conversion information for a pixel in each region in the first embodiment.

FIG. 17 is a table illustrating an example of a part representing a distribution in a horizontal direction of a light distribution table used in a fourth embodiment of the present invention.

FIG. 21 is a flowchart illustrating a procedure of a process in the case of implementing the function of a display control device with the computer of FIG. 20.

DESCRIPTION OF EMBODIMENTS

First Embodiment

Figures 1, 2:
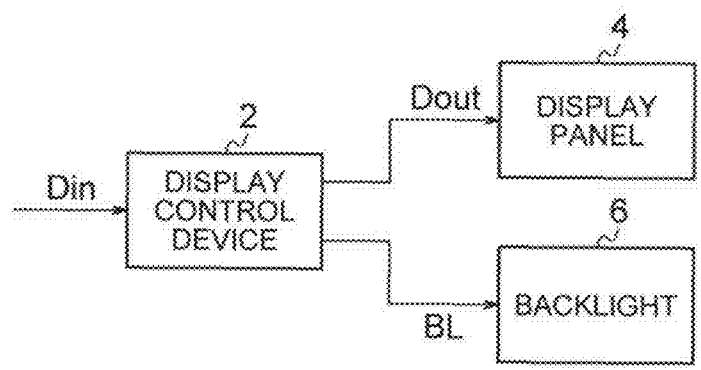
FIG. 1 is a functional block diagram illustrating a configuration of an image display device of a first embodiment of the present invention.
FIG. 2 is a diagram illustrating an arrangement of multiple regions formed by dividing a backlight.

FIG. 1 is a functional block diagram illustrating a configuration of an image display device of a first embodiment of the present invention.

The illustrated image display device includes a display control device 2, a display panel 4, and a backlight 6.

The display panel 4 is, for example, a liquid crystal display panel, and displays an image by changing the transmittance at each pixel position.

The backlight 6 is divided into multiple regions, and the light emission amount thereof can be controlled for each of the multiple regions.

FIG. 2 illustrates the backlight 6 that is divided into 6 in a vertical direction and divided into 8 in a horizontal direction and in which 48 regions A(1,1) to A(8,6) are formed. Although in the illustrated example, the number of regions is 48, the number of regions is not limited to this, and may be, for example, 40 or 80.

The size of each region is, for example, 120 pixels in each of the horizontal and vertical directions.

Each region of the backlight 6 is denoted by reference character A(i,j) according to the position (i,j) in the backlight 6, where i denotes the horizontal position and j denotes the vertical position. Specifically, i indicates that the region is the i-th region from the left, and j indicates that the region is the j-th region from the top.

An image signal Din input to the display control device 2 is a set of pixel signals for respective multiple pixels. The pixel signals may be referred to as image signals for the respective pixels.

The display control device 2 generates and outputs an output image signal by performing color conversion and luminance conversion on the input image signal while sequentially taking, as a pixel of interest, the multiple pixels constituting an image represented by the input image signal Din.

The display control device 2 calculates, from the input image signal Din, a feature amount, such as a luminance or lightness, for each of the multiple regions A(1,1) to A(8,6), calculates, for each region, a light source control value for the region from the calculated feature amount for the region, and controls, for each region, the light emission amount of the region by using the calculated light source control value for the region.

The display control device 2 also generates, for each region A(i,j), color shift information for the region on the basis of the light source control value for the region.

The display control device 2 further acquires, from the input image signal Din, information (pixel position information) indicating the position of the pixel of interest, takes, as multiple reference regions, the region (region of interest) to which the pixel of interest belongs and regions therearound, generates luminance conversion information for the pixel of interest from the light source control value for each of the multiple reference regions and the pixel position information for the pixel of interest, and generates color conversion information for the pixel of interest from the color shift information for each of the multiple reference regions and the pixel position information for the pixel of interest.

The display control device 2 further converts the color and luminance of the input image signal for the pixel of interest on the basis of the color conversion information and luminance conversion information for the pixel of interest to generate an output image signal for the pixel of interest. The above luminance conversion is performed to compensate for the change in intensity of the illumination light due to the changes in the light source control values. The color conversion is performed to compensate for the color change (color shift) of the illumination light due to the changes in the light source control values.

The display control device 2 further controls the transmittance at the position of the pixel of interest of the display panel 4 by using the output image signal for the pixel of interest.

Figure 3:
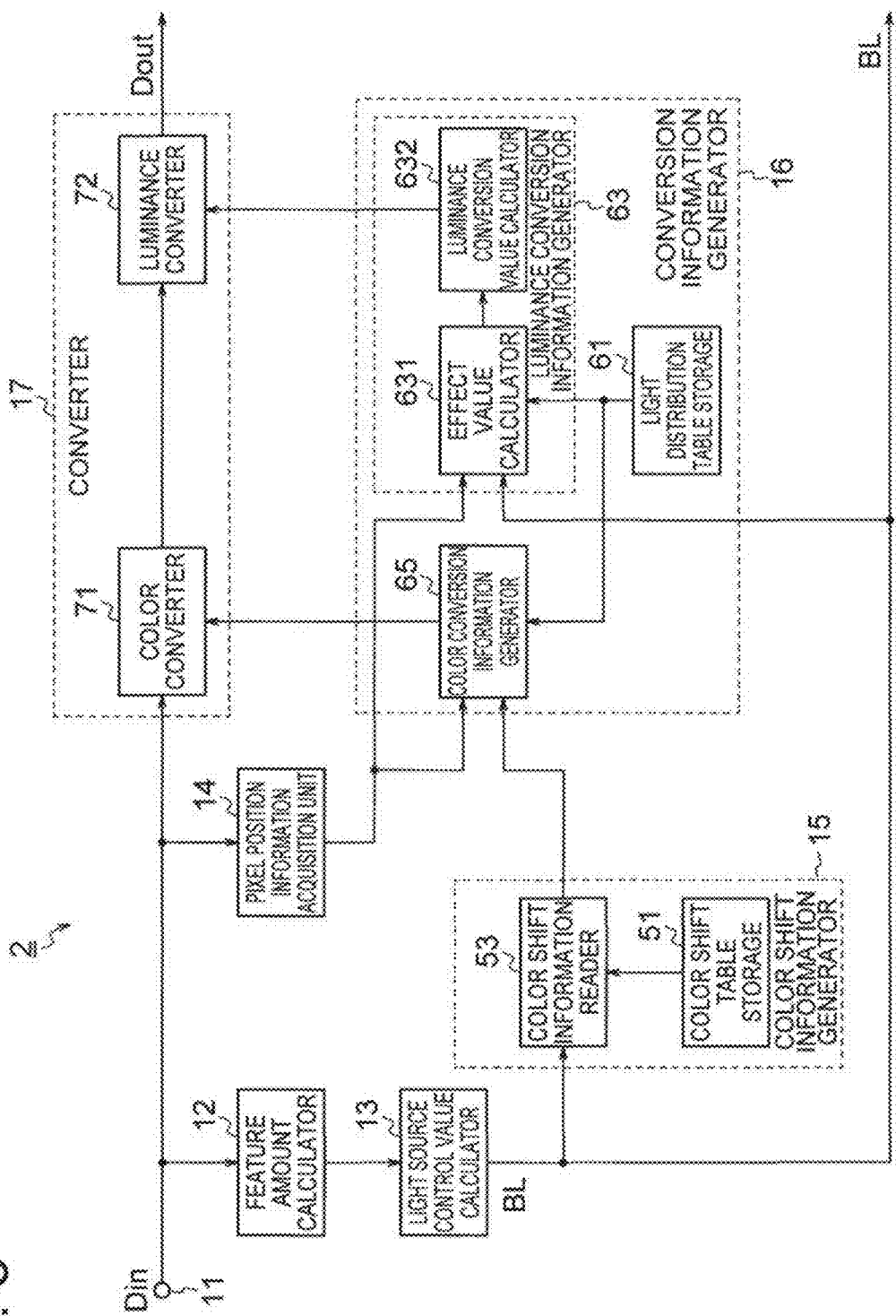
FIG. 3 is a functional block diagram illustrating a configuration of a display control device of the first embodiment.

FIG. 3 is a functional block diagram illustrating a configuration of the display control device 2 of the first embodiment.

The display control device 2 illustrated in FIG. 3 includes an image input terminal 11, a feature amount calculator 12, a light source control value calculator 13, a pixel position information acquisition unit 14, a color shift information generator 15, a conversion information generator 16, and a converter 17.

The image signal Din is input to the image input terminal 11. The image signal Din is constituted by signals Rin, Gin, and Bin representing color components of red, green, and blue, for example.

The image signal Din is a set of the pixel signals indicating pixel values for the respective multiple pixels. The pixel signal for each pixel is constituted by signals indicating red, green, and blue component values for the pixel.

The image represented by the image signal Din may be a still image or a moving image, and may be accompanied by sound or without sound. Although moving images may be referred to as videos, they are referred to as images in this specification.

The feature amount calculator 12 receives the input image signal Din and calculates a feature amount $FT(i,j)$ for each region.

The feature amount $FT(i,j)$ for each region is, for example, a value calculated from one or both of a peak value and an average (or mean) value of the luminance or lightness in the region.

The light source control value calculator 13 calculates a light source control value $BL(i,j)$ for each region.

In calculating the light source control value $BL(i,j)$ for each region, the light source control value calculator 13 may use only the feature amount for the region, or may take into account the feature amount(s) for region(s) around the region in addition to the feature amount for the region.

In calculating the light source control value $BL(i,j)$ for each region, when no feature amounts of regions around the region are taken into account, it is possible that, in cases such as when a special image element (which is an image element that is significantly different in luminance, lightness, hue, or the like from image elements therearound, and is, for example, a mouse pointer) moves across a boundary between regions, the light source control values suddenly change, and the brightness of the backlight suddenly changes, degrading the image quality. Such image degradation can be prevented by taking into account the feature amount(s) for region(s) around the region in calculating the light source control value $BL(i,j)$ for each region.

The pixel position information acquisition unit 14 acquires, for the pixel signal for each pixel, the information (pixel position information) indicating the position of the pixel.

The pixel position information for each pixel is constituted by information (i,j) indicating the position of the region to which the pixel belongs and information indicating the horizontal position x and vertical position y of the pixel in the region.

The information indicating the position of each region is constituted by information indicating the horizontal position i of the region and information indicating the vertical position j of the region.

The information indicating the position of each pixel is constituted by information indicating the horizontal position x of the pixel and information indicating the vertical position y of the pixel.

For example, the horizontal position and vertical position of each pixel are each a position represented by the number of pixels, the horizontal position takes the leftmost pixels in the region as the 0-th pixels, and the vertical position takes the uppermost pixels in the region as the 0-th pixels. Thus, the position of each pixel is represented by two-dimensional coordinates with an origin at the upper left corner of the region to which the pixel belongs.

The color shift information generator 15 generates, for each region, the color shift information for the region from the light source control value $BL(i,j)$ for the region.

The color shift information for each region is information indicating the color shift (color change), or the changes in the intensities of the respective colors, of the illumination light from the region with respect to the change in the light source control value for the region.

When the light source control value changes, it can be considered that the light emission amount of the backlight 6 changes in proportion to the change in the light source control value, but the changes in the light intensities of the respective colors are not uniform.

For example, compared to when the light emission amount of the backlight 6 is a reference value (e.g., the maximum value), when it is 70%, the red light intensity is 73%, the green light intensity is 70%, and the blue light intensity is 69%. Due to such difference, when the light emission amount changes, the color balance is lost. The color shift information is used to compensate for such loss of the color balance.

As the color shift information, information indicating color shift amounts or color shift correction amounts is used.

A color shift amount of each color for each region is a ratio of a normalized value of the light intensity of the color to a normalized value of the light source control value for the region.

Specifically, the color shift amount $SSh(i,j)$ for a color h (h being R, G, or B) is a ratio of a normalized value $Lhn(i,j)$ of the light intensity $Lh(i,j)$ of the color h to a normalized value $BLn(i,j)$ of the light source control value $BL(i,j)$, and is represented by the following Equation (1):

$$SSh(i,j)=Lhn(i,j)/BLn(i,j). \qquad \text{Equation (1)}$$

The normalized value $BLn(i,j)$ of the light source control value $BL(i,j)$ described here is represented by the following Equation (2):

$$BLn(i,j)=BL(i,j)/BL\max(i,j). \qquad \text{Equation (2)}$$

In Equation (2), $BL\max(i,j)$ is a reference value, e.g., the maximum value, of the light source control value $BL(i,j)$.

The normalized value $Lhn(i,j)$ of the light intensity $Lh(i,j)$ of each color is represented by the following Equation (3):

$$Lhn(i,j)=Lh(i,j)/Lh\max(i,j). \qquad \text{Equation (3)}$$

In Equation (3), $Lh\max(i,j)$ is the light intensity of the color when the light source control value $BL(i,j)$ is the reference value $BL\max(i,j)$.

It is necessary that $Lh(i,j)$ in Equation (3) be the light intensity of the color when the light source control value $BL(i,j)$ is the value used in the calculation of Equation (2).

Substituting the relationships of Equations (2) and (3) into Equation (1) yields the relationship of the following Equation (4):

$$SSh(i,j)=\{Lh(i,j)/Lh\max(i,j)\}/\{BL(i,j)/BL\max(i,j)\}. \qquad \text{Equation (4)}$$

Rewriting Equation (4) yields the following Equation (5):

$$SSh(i,j)=\{Lh(i,j)/Lh\max(i,j)\}\times\{BL\max(i,j)/BL(i,j)\}. \qquad \text{Equation (5)}$$

Replacing h with R in Equation (5) yields the following Equation (5R) for red:

$$SSR(i,j)=\{LR(i,j)/LR\max(i,j)\}\times\{BL\max(i,j)/BL(i,j)\}. \qquad (5R)$$

Similarly, for green and blue, the following Equations (5G) and (5B) are obtained:

$$SSG(i,j) = \{LG(i,j)/LG\max(i,j)\} \times \{BL\max(i,j)/BL(i,j)\}, \quad (5G)$$

$$SSB(i,j) = \{LB(i,j)/LB\max(i,j)\} \times \{BL\max(i,j)/BL(i,j)\}. \quad (5B)$$

For the above example, i.e., the example in which, compared to when the light emission amount of the backlight 6 is the reference value (e.g., the maximum value), when it is 70%, the red light intensity is 73%, the green light intensity is 70%, and the blue light intensity is 69%, calculating Equations (5R), (5G), and (5B) on the assumption that the light emission amount of the backlight is proportional to the light source control value yields the following values:

$$SSR(i,j) = (73/100) \times (100/70) = 1.042, \quad \text{Equation (6R)}$$

$$SSG(i,j) = (70/100) \times (100/70) = 1, \quad \text{Equation (6G)}$$

$$SSB(i,j) = (69/100) \times (100/70) = 0.985. \quad \text{Equation (6B)}$$

As can be seen from the above example, for each color, as the color shift amount is closer to 1, it indicates that the change in the light intensity of the color with respect to the change in the light source control value is smaller.

The color shift correction amounts are reciprocals of the color shift amounts.

Thus, equations representing the color shift correction amounts that are obtained by taking the reciprocals of the right-hand sides of Equations (5R), (5G), and (5B) are as follows:

$$CSR(i,j) = \{LR\max(i,j)/LR(i,j)\} \times \{BL(i,j)/BL\max(i,j)\}, \quad \text{Equation (7R)}$$

$$CSG(i,j) = \{LG\max(i,j)/LG(i,j)\} \times \{BL(i,j)/BL\max(i,j)\}, \quad \text{Equation (7G)}$$

$$CSB(i,j) = \{LB\max(i,j)/LB(i,j)\} \times \{BL(i,j)/BL\max(i,j)\}. \quad \text{Equation (7B)}$$

Since the color shift correction amounts are reciprocals of the color shift amounts, they can be said to indirectly indicate the color shift (color change).

Figure 4:
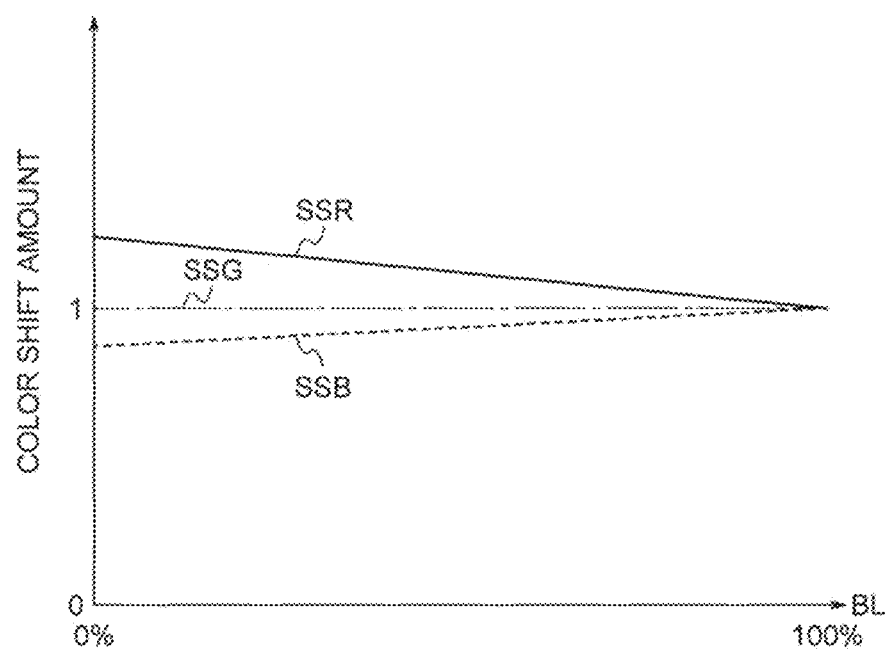
FIG. 4 is a graph illustrating an example of a relationship between a light source control value and color shift amounts.

FIG. 4 illustrates an example of a relationship between the light source control value and the color shift amounts. In FIG. 4, the horizontal axis represents the percentage of the light source control value to the reference value (maximum value). The solid line represents the color shift amount SSR of red, the dot-dash line represents the color shift amount SSG of green, and the dotted line represents the color shift amount SSB of blue.

Figure 5:
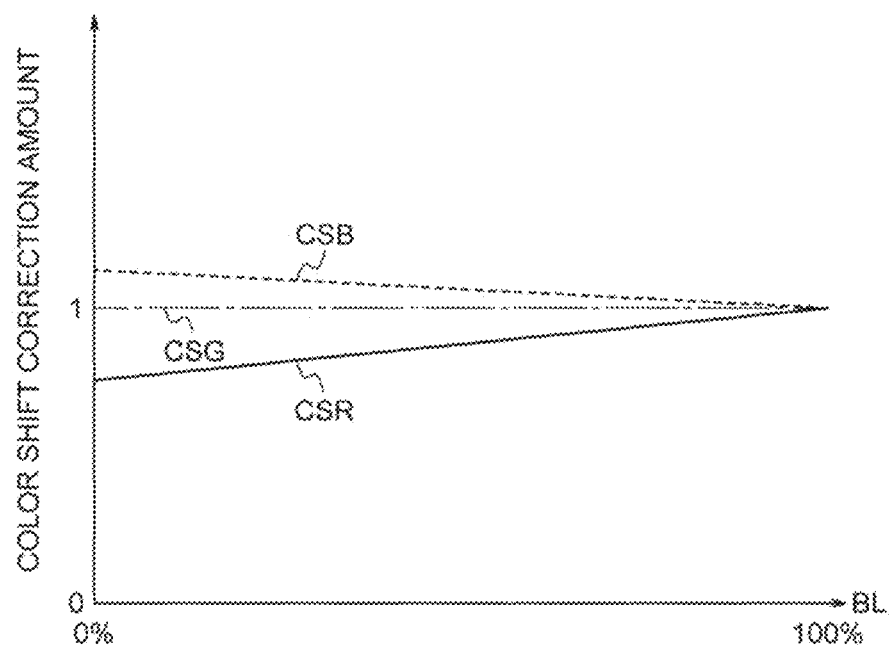
FIG. 5 is a graph illustrating an example of a relationship between the light source control value and color shift correction amounts.

FIG. 5 illustrates an example of a relationship between the light source control value and the color shift correction amounts. In FIG. 5, the horizontal axis represents the percentage of the light source control value to the reference value (maximum value). The solid line represents the color shift correction amount CSR of red, the dot-dash line represents the color shift correction amount CSG of green, and the dotted line represents the color shift correction amount CSB of blue.

Although in the examples of FIGS. 4 and 5, the changes in the color shift amounts and the changes in the color shift correction amounts are linear, these changes are not necessarily along straight lines.

In compensating for the color shift, although it is possible to perform correction for the three colors of red, green, and blue, it is possible to maintain the color balance by performing correction for only two of the three colors. For the remaining one color, it is possible to perform compensation by luminance conversion as needed, or it is also possible to omit correction if the required compensation amount is small. For example, it is possible to maintain the color balance by performing correction for red and blue and omit correction for green.

Thus, the following describes a case of performing correction for red and blue without performing correction for green.

Also, although either the color shift amounts or color shift correction amounts may be used, the color shift correction amounts will be used below. The use of the color shift correction amounts allows the size of the signal processing circuit to be reduced.

The color shift information generator 15 includes a color shift table storage 51 and a color shift information reader 53.

The color shift table storage 51 stores a color shift table CST.

In this embodiment, the color shift table CST represents a relationship between the light source control value BL, the red color shift correction amount CSR, and the blue color shift correction amount CSB.

Specifically, the color shift table CST is such that, by supplying the normalized value of the light source control value as an address, the corresponding red and blue color shift correction amounts can be read. Here, the normalized value is the ratio to the reference value, e.g., the maximum value. The percentage is used as the ratio.

The color shift information reader 53 normalizes the light source control value BL(i,j) calculated by the light source control value calculator 13 with its maximum value as the reference, and supplies the normalized value as the address to the color shift table CST, thereby reading the red and blue color shift correction amounts CSR(i,j) and CSB(i,j) from the color shift table CST.

As described above, the light source control value BL(i,j) for each region calculated by the light source control value calculator 13 is a value for each region, and the color shift correction amounts CSR(i,j) and CSB(i,j) read from the color shift table CST are amounts for the region.

The conversion information generator 16 generates luminance conversion information YS(x,y) and color conversion information CCR(x,y) and CCB(x,y) for each pixel.

The luminance conversion information YS(x,y) for each pixel is generated on the basis of the pixel position information (x,y) for the pixel and the light source control values BL for the region (region of interest) to which the pixel belongs and regions around the region of interest.

The color conversion information CCR(x,y) and CCB(x,y) for each pixel is generated on the basis of the pixel position information (x,y) for the pixel and the color shift information, e.g., the color shift information indicating the color shift correction amounts CSR and CSB, for the region (region of interest) to which the pixel belongs and regions around the region of interest.

The conversion information generator 16 includes a light distribution table storage 61, a luminance conversion information generator 63, and a color conversion information generator 65.

The light distribution table storage 61 stores at least one light distribution table LDT.

The at least one light distribution table LDT represents at least one light distribution. The light distribution represents, for each region of the backlight, a brightness distribution due to the illumination light, or a relationship between the position and the brightness on the display panel, when the region is lighted at a unit light emission amount and the other regions are not lighted. As the light distribution, one represented by measured values or approximate values thereof is used.

The light distribution can be controlled by characteristics of light emitting elements, the optical structure of the display panel, or the like.

In general, when the range of the light distribution is large, and for example, the illumination light from each region affects not only adjacent regions but also farther regions, it is advantageous in terms of equalizing the luminance of the entire display panel, but on the other hand, the effect of local dimming is small. Also, there is a tendency that when the light distribution is large, the amount of required signal processing is large, and the size of the circuit for signal processing is large. The light distribution is controlled in view of these facts.

Here, it is assumed that the effect of the illumination light from each region extends to the outside of the region, specifically regions adjacent to the region and regions adjacent to the adjacent regions.

Also, it is assumed that the light distributions for all the regions are the same. In this case, it is sufficient that the light distribution table storage 61 store only one light distribution table.

Also, it is assumed that the light distribution is symmetrical with respect to a center point (e.g., a center of the lighted region). In this case, it is sufficient to store data representing the light distribution for only one side with respect to the center point.

The light distribution table includes, for example, a portion representing the light distribution in the horizontal direction of the display panel and a portion representing the light distribution in the vertical direction of the display panel. Of the light distribution table, the portion representing the light distribution in the horizontal direction may be referred to as the horizontal table, and the portion representing the light distribution in the vertical direction may be referred to as the vertical table.

The light distribution represented by the light distribution table may be one that does not accurately represent the actual light distribution, and may be one that approximately represents the actual light distribution. Specifically, it should be such that it allows a luminance conversion value and color conversion values (to be described later) to be calculated with practically sufficient accuracy.

Figure 6:
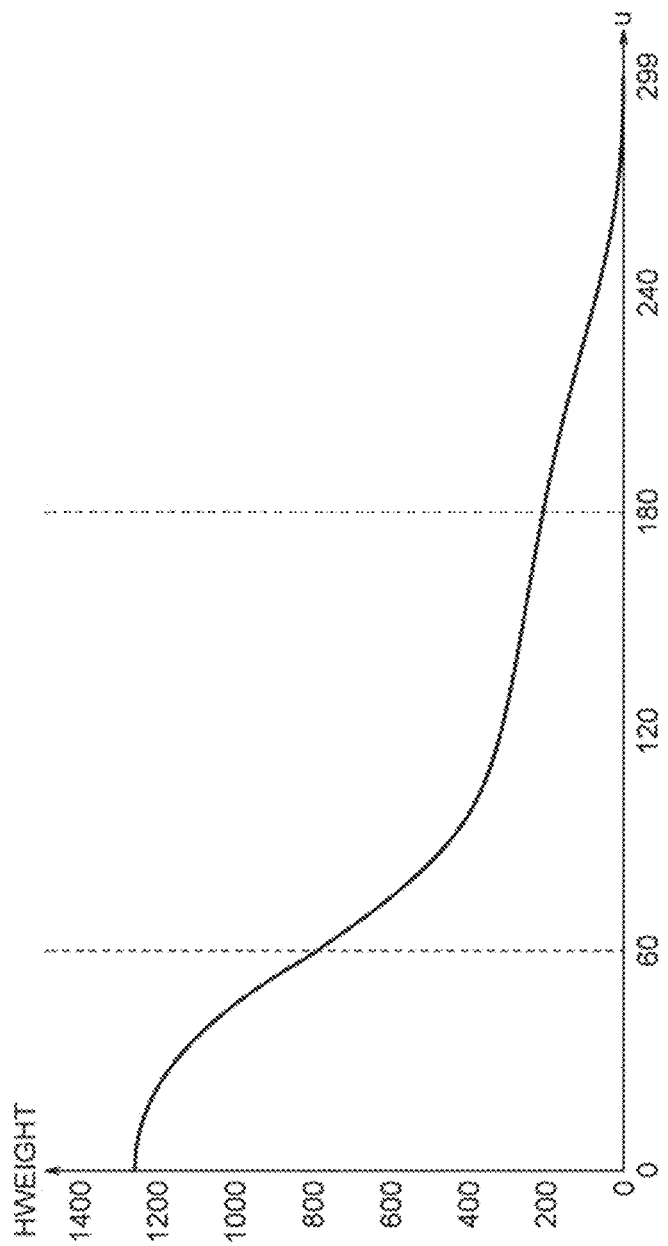
FIG. 6 is a graph illustrating an example of a light distribution curve represented by a light distribution table used in the first embodiment.

FIG. 6 illustrates an example of the distribution when the effect of the illumination light from each region extends to regions adjacent to the region and regions adjacent to the adjacent regions as described above.

FIG. 6 assumes that the light distribution is horizontally symmetrical with respect to a center (e.g., a center of the lighted region), and illustrates the light distribution only in one direction from the center.

In FIG. 6, the horizontal axis represents a horizontal position u, and the vertical axis represents a table value HWEIGHT(u) indicating brightness. The horizontal position u has its origin at the center of the lighted region. The horizontal position u is represented by, for example, the number of pixels. The table value HWEIGHT(u) represents the brightness at the position u due to the illumination light from the lighted region. However, the value on the vertical axis is a relative value of the brightness defined for convenience of calculation.

The brightness at the position u described here corresponds to the intensity of light illuminating the display panel 4 at the position u, and the luminance of the displayed image is determined by a product of a luminance component of the image signal used for control of the transmittance of the display panel 4 and the above brightness.

In the example of FIG. 6, the size of one region is 120 pixels, and the point at a value 0 on the horizontal axis corresponds to the center of the lighted region. Also, the points at values 60 and 180 on the horizontal axis correspond to boundaries between regions.

Although in the example illustrated in FIG. 6, the horizontal position is represented by the number of pixels, it may be represented by a value corresponding to the number of pixels other than the number of pixels.

In the light distribution table, for example, the table value is defined and stored for each of the pixels arranged in the horizontal direction. In other words, the table value HWEIGHT(u) is defined and stored for each integer of the above horizontal position u. When it is assumed that the illumination light from each region reaches the regions adjacent to the region and the regions adjacent to the adjacent regions, and the size of each region is 120, as described above, the table value is defined and stored for each of the integers in the range of u=0 to 299. An example of such a table is illustrated in FIG. 7.

The distribution in the vertical direction represented by the light distribution table is similar to the distribution illustrated in FIG. 6. However, the vertical position is denoted by v, and the table value is denoted by VWEIGHT (v). The vertical position v has its origin at the center of the lighted region. As with the table value HWEIGHT(u), the table value VWEIGHT(v) is defined and stored for each of the integers in the range of v=0 to 299.

In this manner, the light distribution table LDT has the table value HWEIGHT(u) defined for each of the pixels located at different positions in the horizontal direction and the table value VWEIGHT(v) defined for each of the pixels located at different positions in the vertical direction.

As above, each table value of the light distribution table LDT indicates the brightness at each position on the display panel due to the illumination light from the region lighted at the unit light emission amount. Thus, when the light emission amount of the region is not the unit light emission amount, the brightness due to the illumination light from the region is determined by a product of the light emission amount and the table value.

When multiple regions are lighted, the brightness at each position, e.g., the position of the pixel of interest, on the display panel is a sum of the effects on the brightness due to the illumination light from the multiple regions.

In view of these facts, the table values of the light distribution table LDT may be referred to as effect coefficients.

Thus, the effect coefficients can be said to indicate the degree of the effect of the illumination light from each region on the brightness at each position on the display panel.

Also, it can be said that the table values of the light distribution table LDT indicate effect coefficients, the horizontal table has effect coefficients representing the light distribution in the horizontal direction, and the vertical table has effect coefficients representing the light distribution in the vertical direction. The effect coefficients representing the light distribution in the horizontal direction are effect coefficients indicating the degrees of the effects in the horizontal direction, and the effect coefficients representing the light distribution in the vertical direction are effect coefficients indicating the degrees of the effects in the vertical direction.

Moreover, the light distribution table used in this embodiment represents, for each of the multiple regions, the distribution of the brightness due to the illumination light from the region in an area outside the region as well. Thus, the effect coefficients used in this embodiment are defined on the assumption that the effect of the illumination light from each of the multiple regions extends to the outside of the region.

The luminance conversion information generator 63 generates luminance conversion information YS(x,y) for each pixel.

The luminance conversion information generator 63 includes an effect value calculator 631 and a luminance conversion value calculator 632.

The effect value calculator 631 calculates a luminance effect value BB(x,y) for each pixel, on the basis of the pixel position information (x,y) of the pixel and the light source control values BL(i,j) for the region including the pixel and regions therearound, with reference to the light distribution table LDT.

The effect value calculator 631 calculates the luminance effect value BB, which is a sum of the effects of the illumination light from the multiple reference regions at the position of the pixel of interest, by a product-sum operation using effect coefficients and the light source control values for the multiple reference regions.

The luminance conversion value calculator 632 generates the luminance conversion information from the luminance effect values BB.

The luminance conversion value calculator 632 calculates a luminance conversion value YS(x,y) for each pixel, by performing a predetermined calculation on the luminance effect value BB(x,y) for the pixel.

The luminance conversion values YS(x,y) are supplied as the luminance conversion information to the converter 17.

The following describes a case of taking, as the region of interest, one of the multiple regions illustrated in FIG. 2, calculating the luminance effect value BB(x,y) for a pixel (the pixel of interest) in the region of interest, generating the luminance conversion value YS(x,y) from the calculated luminance effect value BB(x,y), and outputting the generated luminance conversion value YS(x,y) as the luminance conversion information for the pixel of interest.

Such a process is performed by taking, as the reference regions, 5×5 regions A(i−2,j−2) to A(i+2,j+2) centered on the region of interest A(i,j), as illustrated in FIG. 8, and using the light source control values for the reference regions.

Figure 9:
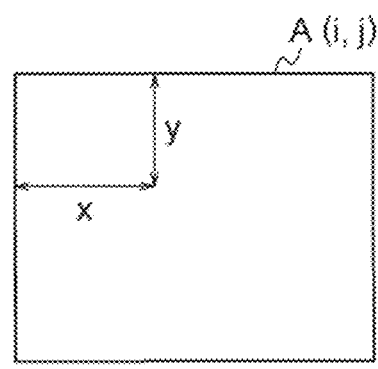
FIG. 9 is a diagram illustrating a way of representing a position of a pixel in a region in the first embodiment.

A pixel position in the region A(i,j) is represented by two-dimensional coordinates (x,y) with its origin at the upper left corner of the region, as illustrated in FIG. 9.

For each of the multiple reference regions, the effect value calculator 631 determines, on the basis of the pixel position information (x,y) of the pixel of interest, a relative position (u,v) of the pixel of interest relative to the reference region, and determines the effect coefficients HWEIGHT(u) and VWEIGHT(v) for the reference region by referring to the light distribution table LDT with the determined relative position (u,v).

The relative position (u,v) of the pixel of interest relative to each of the multiple reference regions described here is, for example, a relative position relative to a center of the reference region, and is determined from a positional relationship between the reference region and the region of interest, the size of each region, and the position (x,y) of the pixel of interest in the region of interest.

For example, when the region size is 120 pixels, the relative position (u,v) relative to the reference region A(i−1,j−1) located to the left of and above the region of interest A(i,j) is determined by $u = x + 60,$ $v = y + 60.$ The relative position (u,v) relative to the reference region A(i+1,j−1) located to the right of and above the region of interest A(i,j) is determined by $u = 179 - x,$ $v = y + 60.$ The reason why "u=179−x" instead of "u=180−x" is because the value of x in each region takes values in the range of 0 to 119.

As can be seen from the above example, it is sufficient that the relative position indicate the distances (absolute values of the relative position) from a reference position (center) of the reference region. This is because the relative position is used for calculation of the effect coefficients and it is assumed that the light distribution is horizontally symmetrical and vertically symmetrical.

The effect value calculator 631 determines the luminance effect value BB by using the effect coefficients HWEIGHT(u) and VWEIGHT(v) obtained as described above.

For example, the effect value calculator 631 determines sums of effects in the horizontal direction at different positions in the vertical direction by performing product-sum operations by using the light source control values for the multiple reference regions arranged in the horizontal direction at the different positions in the vertical direction and the effect coefficients of the horizontal table, and determines the luminance effect value BB by performing a product-sum operation by using the sums of the effects in the horizontal direction and the effect coefficients of the vertical table.

The sums of the effects in the horizontal direction are each a sum of effects on the position of the pixel of interest or a pixel that is at the same horizontal position as the pixel of interest and located in a different region from the pixel of interest due to the illumination light from the region including the pixel and the other regions that are at the same vertical position as the region (the other regions arranged in the horizontal direction).

The calculation of the sum of the effects of a group of the regions at a vertical position of (j−2), i.e., the regions A(i−2,j−2) to A(i+2,j−2), will be described with reference to FIG. 10.

Figure 10:
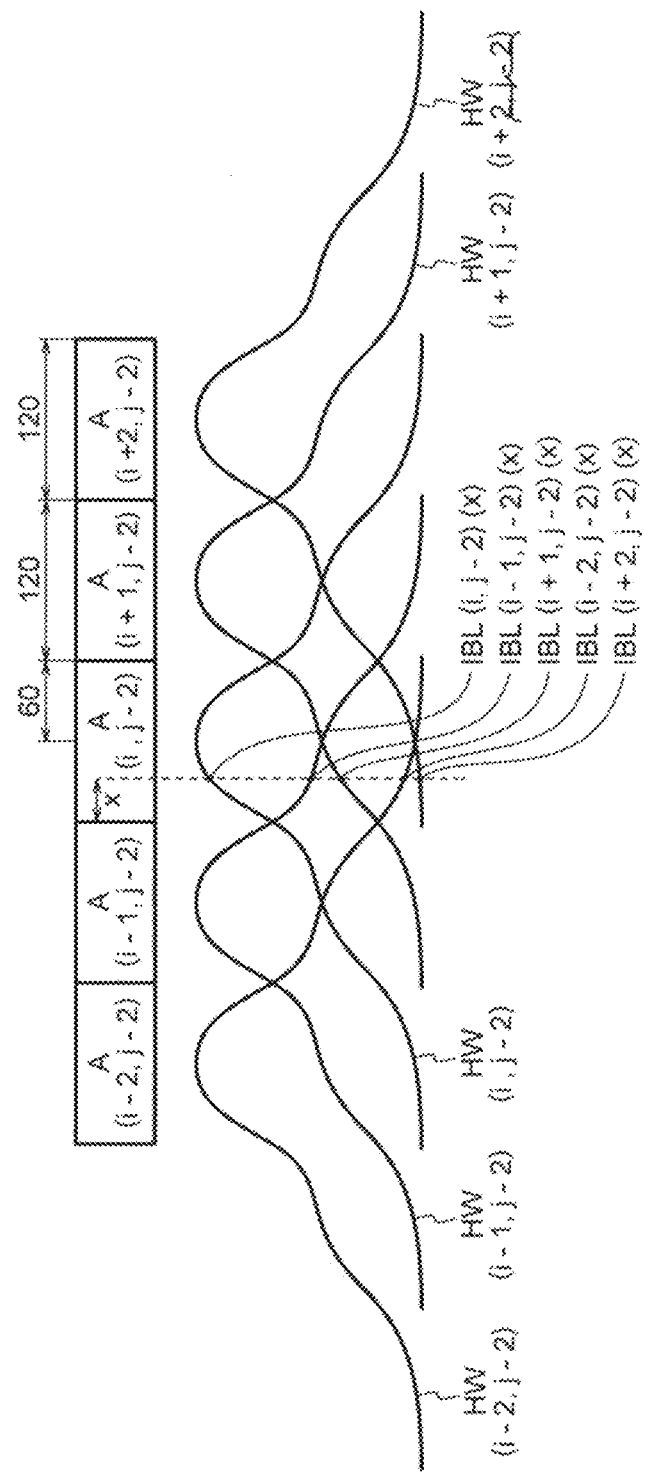
FIG. 10 is a diagram illustrating effects at a position of a pixel of interest due to illumination light from multiple regions arranged in the horizontal direction.

In FIG. 10, the curves HW(i−2,j−2) to HW(i+2,j−2) represent the magnitudes of the effects on each position due to the illumination light from the regions A(i−2,j−2) to A(i+2,j−2), respectively.

FIG. 10 assumes that all the regions have the same light distribution, and the light source control values BL(i−2,j−2) to BL(i+2,j−2) are equal.

In FIG. 10, the magnitudes of the effects of the illumination light from the regions A(i−2,j−2) to A(i+2,j−2) at a horizontal position x in the region A(i,j−2) are denoted by IBL(i−2,j−2)(x) to IBL(i+2,j−2)(x).

The light source control values for the regions A(i−2,j−2) to A(i+2,j−2) will be denoted by BL(i−2,j−2) to BL(i+2,j−2), respectively.

The effects IBL(i−2,j−2) to IBL(i+2,j−2) of the illumination light from the regions A(i−2,j−2) to A(i+2,j−2) are given by products of light source control values and effect coefficients, as respectively represented by the following Equations (8a) to (8e):

$$IBL(i-2,j-2) = BL(i-2,j-2) * H\text{WEIGHT}(x+180), \quad \text{Equation (8a)}$$

$$IBL(i-1,j-2) = BL(i-1,j-2) * H\text{WEIGHT}(x+60), \quad \text{Equation (8b)}$$

$$IBL(i,j-2) = BL(i,j-2) * H\text{WEIGHT}(|59-x|), \quad \text{Equation (8c)}$$

$$IBL(i+1,j-2)=BL(i+1,j-2)*HWEIGHT(179-x), \quad \text{Equation (8d)}$$

$$IBL(i+2,j-2)=BL(i+2,j-2)*HWEIGHT(299-x). \quad \text{Equation (8e)}$$

In Equation (8c), the absolute value of "59−x" is used in consideration of the fact that x may be greater than 59. The same applies to "|59−y|" in Equation (10) to be described later. This also applies to similar equations below.

A sum VB(j−2) of the effects of the region group consisting of the regions A(i−2,j−2) to A(i+2,j−2) on a pixel at a horizontal position x in the region A(i,j−2) is given by a sum of the effects of the five regions, as represented by the following Equation (9):

$$\begin{aligned}
VB(j-2) &= IBL(i-2, j-2) + IBL(i-1, j-2) + \\
&\quad IBL(i, j-2) + IBL(i+1, j-2) + IBL(i+2, j-2) = \\
&\quad BL(i-2, j-2)*HWEIGHT(x+180) + \\
&\quad BL(i-1, j-2)*HWEIGHT(x+60) + \\
&\quad BL(i, j-2)*HWEIGHT(|59-x|) + BL(i+1, j-2)* \\
&\quad HWEIGHT(179-x) + BL(i+2, j-2)*HWEIGHT(299-x).
\end{aligned} \quad \text{Equation (9)}$$

The same calculation as described above is performed for the region groups at vertical positions of (j−1) to (j+2), and the sums VB(j−1), VB(j), VB(j+1), and VB(j+2) of the effects of the respective region groups are determined.

The sum BB(x,y) of the effects of the 25 regions is determined by performing a product-sum operation by using the sums VB(j−2) to VB(j+2) of the effects determined as described above and the effect coefficients VWEIGHT representing the distribution in the vertical direction of the light distribution table LDT, as represented by the following Equation (10):

$$\begin{aligned}
BB(x,y) &= VB(j-2)*VWEIGHT(y+180) + \\
&\quad VB(j-1)*VWEIGHT(y+60) + VB(j)*VWEIGHT \\
&\quad (|59-y|) + VB(j+1)*VWEIGHT(179-y) + \\
&\quad VB(j+2)*VWEIGHT(299-y).
\end{aligned} \quad \text{Equation (10)}$$

The sum BB(x,y) of the effects determined in this manner is the sum of the effects on the brightness at the position (x,y) in the region A(i,j) due to the illumination light from the region and the 24 peripheral regions, and is referred to as a luminance effect value.

The luminance conversion value calculator 632 determines the luminance conversion value YS(x,y) from the luminance effect value BB(x,y). The luminance conversion value YS(x,y) is multiplied with an image signal in a luminance converter 72, as described later.

In calculation of the luminance conversion value YS(x,y) based on the luminance effect value BB(x,y), a relationship between the value of the image signal and the brightness of the displayed image is taken into account.

For example, when the brightness of the displayed image is proportional to the y-th power of the image signal, the luminance conversion value YS(x,y) is determined by the following Equation (11):

$$YS(x,y)=1/BBn(x,y)^{1/\gamma}. \quad \text{Equation (11)}$$

BBn(x,y) is a value obtained by normalizing BB(x,y) with its maximum value as a reference (with the maximum value as 1).

γ is, for example, 2.2.

The luminance conversion value YS(x,y) determined in this manner is a correction coefficient indicating the degree of correction required to cancel the change in the effect at the position (x,y) in the region A(i,j) due to the illumination light from the region and the 24 peripheral regions.

The luminance conversion value YS(x,y) is calculated for each pixel and supplied as the luminance conversion information to the converter 17.

It is preferable that the value HWEIGHTSUM calculated by the following Equation (12) be constant for any value of x=0 to 59, and the value VWEIGHTSUM calculated by the following Equation (13) be constant for any value of y=0 to 59.

If they are not constant, luminance unevenness occurs. However, if the luminance unevenness is not perceived by the human eye, it is acceptable. For example, in the example illustrated in FIG. 6, the values obtained by calculation of Equations (12) and (13) are a particular value, specifically "2048" or a value near "2048", and are constant. In an actual circuit, after the calculation of Equation (9) or (10), a division by "2048" is performed. The above particular value "2048" is determined in view of calculation accuracy, simplification of division in a signal processing circuit formed by a digital circuit, or the like.

$$\begin{aligned}
HWEIGHTSUM &= HWEIGHT(x+180) + HWEIGHT(x+ \\
&\quad 60) + HWEIGHT(|59-x|) + HWEIGHT(179-x) + \\
&\quad HWEIGHT(299-x)
\end{aligned} \quad \text{Equation (12)}$$

$$\begin{aligned}
VWEIGHTSUM &= VWEIGHT(y+180) + VWEIGHT(y+ \\
&\quad 60) + VWEIGHT(|59-y|) + VWEIGHT(179-y) + \\
&\quad VWEIGHT(299-y)
\end{aligned} \quad \text{Equation (13)}$$

The color conversion information generator 65 generates color conversion information CCR(x,y) and CCB(x,y) for each pixel.

The color conversion information generator 65 generates color conversion information for the pixel of interest by a product-sum operation using effect coefficients and the color shift information for the multiple reference regions.

Here, it is assumed that information indicating the color shift correction amounts is generated as the color shift information.

The color conversion information CCR(x,y) for each pixel is calculated on the basis of the pixel position information (x,y) for the pixel and the color shift correction amounts CSR(i,j) for the region including the pixel and regions therearound, with reference to the light distribution table LDT.

Similarly, the color conversion information CCB(x,y) for each pixel is calculated on the basis of the pixel position information (x,y) for the pixel and the color shift correction amounts CSB(i,j) for the region including the pixel and regions therearound, with reference to the light distribution table LDT.

The following describes a case of taking, as the region of interest, one of the multiple regions illustrated in FIG. 2, and generating the color conversion information for a pixel (the pixel of interest) in the region of interest.

The generation of the color conversion information can be performed based on the same idea as the generation of the luminance conversion information. Specifically, a calculation that is the same as in the generation of the luminance conversion information is performed, although it differs in that the color shift correction amounts CSR(i,j) and CSB(i,j) are used instead of the light source control values BL(i,j) used in the generation of the luminance conversion information.

Acquisition of effect coefficients HWEIGHT and VWEIGHT is performed in the same manner as in the process in the effect value calculator 631. Specifically, for each of the multiple reference regions, the color conversion information generator 65 determines, on the basis of the pixel position information (x,y) for the pixel of interest, a relative position (u,v) of the pixel of interest relative to the reference region, and determines the effect coefficients HWEIGHT(u) and VWEIGHT(v) for the reference region by referring to the light distribution table LDT with the determined relative position (u,v).

The color conversion information generator 65 generates the color conversion information CCR(x,y) and CCB(x,y) by using the effect coefficients HWEIGHT(u) and VWEIGHT(v) obtained as described above.

For generalization, a process for a color h (h being R or B) will be first described.

A sum of effects of color shifts in the horizontal direction is calculated by using the effect coefficients HWEIGHT representing the distribution in the horizontal direction of the light distribution table LDT.

The effects of the color shifts described here are effects at the position of each pixel due to the color shift of the illumination light from each region indicated by the color shift information for each region generated by the color shift information generator 15.

The sum of the effects of the color shifts in the horizontal direction is a sum of effects on the pixel of interest or a pixel that is at the same horizontal position as the pixel of interest and located in a different region from the pixel of interest due to the color shifts of the illumination light from the region including the pixel and the other regions that are at the same vertical position as the region (the other regions arranged in the horizontal direction).

It can be considered that for each region, the degree of the effect of the color shift of the illumination light from the region at each position in and around the region is proportional to the brightness due to the illumination light from the region. Thus, degrees of effects of color shifts can be calculated by using the effect coefficients of the light distribution table.

The color shift correction amounts of the color h (h=R or B) for a group of the regions at a vertical position of (j−2), i.e., the regions A(i−2,j−2) to A(i+2,j−2), will be respectively denoted by CSh(i−2,j−2) to CSh(i+2,j−2), and a sum of the effects in the horizontal direction is calculated by using the effect coefficients HWEIGHT representing the distribution in the horizontal direction of the light distribution table LDT.

This calculation can be performed in the same manner as in the calculation of the luminance effect value. Specifically, by replacing BL(i−2,j−2) to BL(i+2,j−2) in Equation (9) with CSh(i−2,j−2) to CSh(i+2,j−2), VCSh(j−2) is calculated as shown in the following Equation (14):

$$VCSh(j-2)=CSh(i-2,j-2)*H\text{WEIGHT}(x+180)+CSh(i-1,j-2)*H\text{WEIGHT}(x+60)+CSh(i,j-2)*H\text{WEIGHT}(|59-x|)+CSh(i+1,j-2)*H\text{WEIGHT}(179-x)+CSh(i+2,j-2)*H\text{WEIGHT}(299-x).$$
Equation (14)

The same calculation as described above is performed for the region groups at vertical positions of (j−1) to (j+2), and the sums VCSh(j−1), VCSh(j), VCSh(j+1), and VCSh(j+2) of the effects of the respective region groups are determined.

The sum CCh(x,y) of the effects of the 25 regions is determined by performing a product-sum operation by using the sums VCSh(j−2) to VCSh(j+2) of the effects calculated as described above and the effect coefficients VWEIGHT representing the distribution in the vertical direction of the light distribution table LDT.

This calculation is performed by the following Equation (15) similar to the above Equation (10):

$$CCh(x,y)=VCSh(j-2)*V\text{WEIGHT}(y+180)+VCSh(j-1)*V\text{WEIGHT}(y+60)+VCSh(j)*V\text{WEIGHT}(|59-y|)+VCSh(j+1)*V\text{WEIGHT}(179-y)+VCSh(j+2)*V\text{WEIGHT}(299-y).$$
Equation (15)

The sum CCh(x,y) of the effects determined in this manner is the sum of the effects of the color shifts of the illumination light from the region and the 24 peripheral regions at the position (x,y) in the region A(i,j).

The above sum CCh(x,y) is used as a color conversion value.

When the color shift information is information indicating the color shift correction amounts as assumed here, it is possible to perform correction for color shift by multiplying the image signal by the above sum CCh(x,y) as a color conversion value.

Thus, the color shift due to the changes in the light source control values can be cancelled by changing the transmittance of the pixel of the display panel by image signal correction.

In a case where the color h is red R, when the red color shift correction amounts are denoted by CSR(i−2,j−2) to CSR(i+2,j−2), Equation (14) can be rewritten as Equation (14R) by replacing h with R, and Equation (15) can be rewritten as Equation (15R) by replacing h with R:

$$VCSR(j-2)=CSR(i-2,j-2)*H\text{WEIGHT}(x+180)+CSR(i-1,j-2)*H\text{WEIGHT}(x+60)+CSR(i,j-2)*H\text{WEIGHT}(|59-x|)+CSR(i+1,j-2)*H\text{WEIGHT}(179-x)+CSR(i+2,j-2)*H\text{WEIGHT}(299-x),$$
Equation (14R)

$$CCR(x,y)=VCSR(j-2)*V\text{WEIGHT}(y+180)+VCSR(j-1)*V\text{WEIGHT}(y+60)+VCSR(j)*V\text{WEIGHT}(|59-y|)+VCSR(j+1)*V\text{WEIGHT}(179-y)+VCSR(j+2)*V\text{WEIGHT}(299-y).$$
Equation (15R)

In a case where the color h is blue B, when the blue color shift correction amounts are denoted by CSB(i−2,j−2) to CSB(i+2,j−2), Equation (14) can be rewritten as Equation (14B) by replacing h with B, and Equation (15) can be rewritten as Equation (15B) by replacing h with B:

$$VCSB(j-2)=CSB(i-2,j-2)*H\text{WEIGHT}(x+180)+CSB(i-1,j-2)*H\text{WEIGHT}(x+60)+CSB(i,j-2)*H\text{WEIGHT}(|59-x|)+CSB(i+1,j-2)*H\text{WEIGHT}(179-x)+CSB(i+2,j-2)*H\text{WEIGHT}(299-x),$$
Equation (14B)

$$CCB(x,y)=VCSB(j-2)*V\text{WEIGHT}(y+180)+VCSB(j-1)*V\text{WEIGHT}(y+60)+VCSB(j)*V\text{WEIGHT}(|59-y|)+VCSB(j+1)*V\text{WEIGHT}(179-y)+VCSB(j+2)*V\text{WEIGHT}(299-y).$$
Equation (15B)

The calculations of Equations (14R), (15R), (14B), and (15B) are performed by the color conversion information generator 65.

The color conversion values CCR(x,y) and CCB(x,y) are supplied as the color conversion information to the converter 17.

The converter 17 converts the color of the image signal to the image input terminal 11 on the basis of the color conversion information generated by the color conversion information generator 65 of the conversion information generator 16, and converts the luminance of the image signal on the basis of the luminance conversion information generated by the luminance conversion information generator 63 of the conversion information generator 16.

The converter 17 includes a color converter 71 and the luminance converter 72.

The color converter 71 uses the color conversion values CCR(x,y) and CCB(x,y) calculated by the color conversion information generator 65 to perform color conversion on the image signal according to Equations (16R), (16G), and (16B):

$$RC(x,y)=Rin(x,y)*CCR(x,y),\qquad\text{Equation (16R)}$$

$$GC(x,y)=Gin(x,y),\qquad\text{Equation (16G)}$$

$$BC(x,y)=Bin(x,y)*CCB(x,y).\qquad\text{Equation (16B)}$$

In Equations (16R), (16G), and (16B),

Rin(x,y), Gin(x,y), and Bin(x,y) are image signals input to the color converter 71, and RC(x,y), GC(x,y), and BC(x,y) are image signals obtained by color conversion by the color converter 71.

In the above example, the color shift information generator 15 calculates the color shift correction amounts, which are reciprocals of the color shift amounts, and outputs the calculated color shift correction amounts as the color shift information; the color conversion information generator 65 calculates the color conversion values from the color shift correction amounts; and the color converter 71 performs correction on the image signals by multiplying the image signals by the calculated color conversion values.

When the color shift information generator 15 calculates the color shift amounts instead of the color shift correction amounts, the color conversion information generator 65 should calculate color conversion values by performing the same product-sum operation as described above on the basis of the color shift amounts, and the color converter 71 should multiply the image signals by reciprocals of the calculated color conversion values.

The luminance converter 72 converts the luminance of the image signals obtained by the color conversion by the color converter 71, by using the luminance conversion information generated by the luminance conversion information generator 63.

The luminance converter 72 uses the luminance conversion value YS(x,y) calculated by the luminance conversion information generator 63 to perform luminance conversion on the image signals according to Equations (17R), (17G), and (17B):

$$Rout(x,y)=RC(x,y)*YS(x,y),\qquad\text{Equation (17R)}$$

$$Gout(x,y)=GC(x,y)*YS(x,y),\qquad\text{Equation (17G)}$$

$$Bout(x,y)=BC(x,y)*YS(x,y).\qquad\text{Equation (17B)}$$

In Equations (17R), (17G), and (17B),

Rout(x,y), Gout(x,y), and Bout(x,y) are image signals obtained by luminance conversion by the luminance converter 72, and the signals Rout(x,y), Gout(x,y), and Bout(x,y) constitute an output image signal Dout.

Although in FIG. 3, the luminance converter 72 is disposed after the color converter 71, the order may be reversed.

The display panel 4 is controlled by the image signal Dout obtained by the luminance conversion by the luminance converter 72. Specifically, the transmittance of each pixel of the display panel is controlled by the image signal Dout for the pixel output from the luminance converter 72.

The backlight 6 is controlled by the light source control values BL(i,j) calculated by the light source control value calculator 13. Specifically, the light emission amount of each region A(i,j) is controlled by the light source control value BL(i,j) for the region.

As described above, the color conversion information and luminance conversion information for each pixel are generated for each pixel, and in view of the times required for these processes, it is necessary to input the input image signals to the color converter and luminance converter after delaying the input image signals to adjust the timings.

The same timing adjustment may be needed in other portions of the display control device.

Since such a process of delay and timing adjustment is common, the illustration is omitted, and the detailed description is also omitted. The same applies to the other embodiments described below.

In the above example, the light distribution table LDT includes the horizontal table and vertical table, and the conversion information generator 16 determines the luminance effect value BB by performing product-sum operations by using the light source control values for the multiple reference regions arranged in the horizontal direction at different positions in the vertical direction and the effect coefficients of the horizontal table, and performing a product-sum operation by using the results of the above product-sum operations at the different positions in the vertical direction and the effect coefficients of the vertical table.

However, the order of the process in the horizontal direction and the process in the vertical direction may be reversed. In short, it is sufficient that the light distribution table LDT include first effect coefficients representing a light distribution in a first direction of the display panel and second effect coefficients representing a light distribution in a second direction of the display panel, and the conversion information generator 16 determine the luminance effect value BB by performing product-sum operations by using the light source control values for the multiple reference regions arranged in the first direction at different positions in the second direction and the first effect coefficients, and performing a product-sum operation by using the results of the above product-sum operations at the different positions in the second direction and the second effect coefficients.

In the above example, the size of one region of the backlight is 120 pixels in each of the horizontal direction and vertical direction. However, the size of each region is not limited to the above example. Also, the sizes (the numbers of pixels) in the horizontal direction and vertical direction may be different. For example, it is possible that the size in the horizontal direction is 240 pixels, and the size in the vertical direction is 120 pixels.

In the above configuration, each region is taken as the region of interest, and in generating the luminance conversion information and color conversion information for a pixel in the region of interest, the light source control values and color shift information for 5×5 regions centered on the region of interest are used.

When the region of interest is near an edge of the backlight, i.e., when the region of interest is the first or second region from one of the edges, it is not possible to form a region group consisting of 5×5 regions centered on the region of interest.

In this case, as substitute for the light source control value and color shift information for a missing region, the light source control value and color shift information for a region that is located on the same side as the missing region and is the closest to the missing region may be used.

For example, when the region A(7,5) in FIG. 2 is taken as the region of interest A(i,j) illustrated in FIG. 8, substitution of light source control values and color shift information may be performed as follows.

The light source control value and color shift information for the region A(8,3) are used not only as the light source control value and color shift information for the region A(i+1,j−2) but also as the light source control value and color shift information for the region A(i+2,j−2).

The light source control value and color shift information for the region A(8,4) are used not only as the light source control value and color shift information for the region A(i+1,j−1) but also as the light source control value and color shift information for the region A(i+2,j−1).

The light source control value and color shift information for the region A(8,5) are used not only as the light source control value and color shift information for the region A(i+1,j) but also as the light source control value and color shift information for the region A(i+2,j).

The light source control value and color shift information for the region A(5,6) are used not only as the light source control value and color shift information for the region A(i−2,j+1) but also as the light source control value and color shift information for the region A(i−2,j+2).

The light source control value and color shift information for the region A(6,6) are used not only as the light source control value and color shift information for the region A(i−1,j+1) but also as the light source control value and color shift information for the region A(i−1,j+2).

The light source control value and color shift information for the region A(7,6) are used not only as the light source control value and color shift information for the region A(i,j+1) but also as the light source control value and color shift information for the region A(i,j+2).

The light source control value and color shift information for the region A(8,6) are used not only as the light source control value and color shift information for the region A(i+1,j+1) but also as the light source control value and color shift information for the region A(i+1,j+2), the light source control value and color shift information for the region A(i+2,j+1), and light source control value and color shift information for the region A(i+2,j+2).

Second Embodiment

Although the configuration of a display control device of a second embodiment of the present invention is the same as that of the display control device 2 of the first embodiment illustrated in FIG. 3, the light distribution table LDT stored in the light distribution table storage 61 differs in content from that of the first embodiment, and the processes in the luminance conversion information generator 63 and color conversion information generator 65 differ in content from those of the first embodiment.

While in the first embodiment, the effect coefficients are defined on the assumption that the effect of the illumination light from each region extends to regions adjacent to regions adjacent to the region, in this embodiment, the effect coefficients are defined on the assumption that the effect of the illumination light from each region extends to middles of adjacent regions. Thereby, in this embodiment, the size of the light distribution table LDT is reduced, and the circuit size of the luminance conversion information generator 63 and color conversion information generator 65 is reduced.

Figure 11:
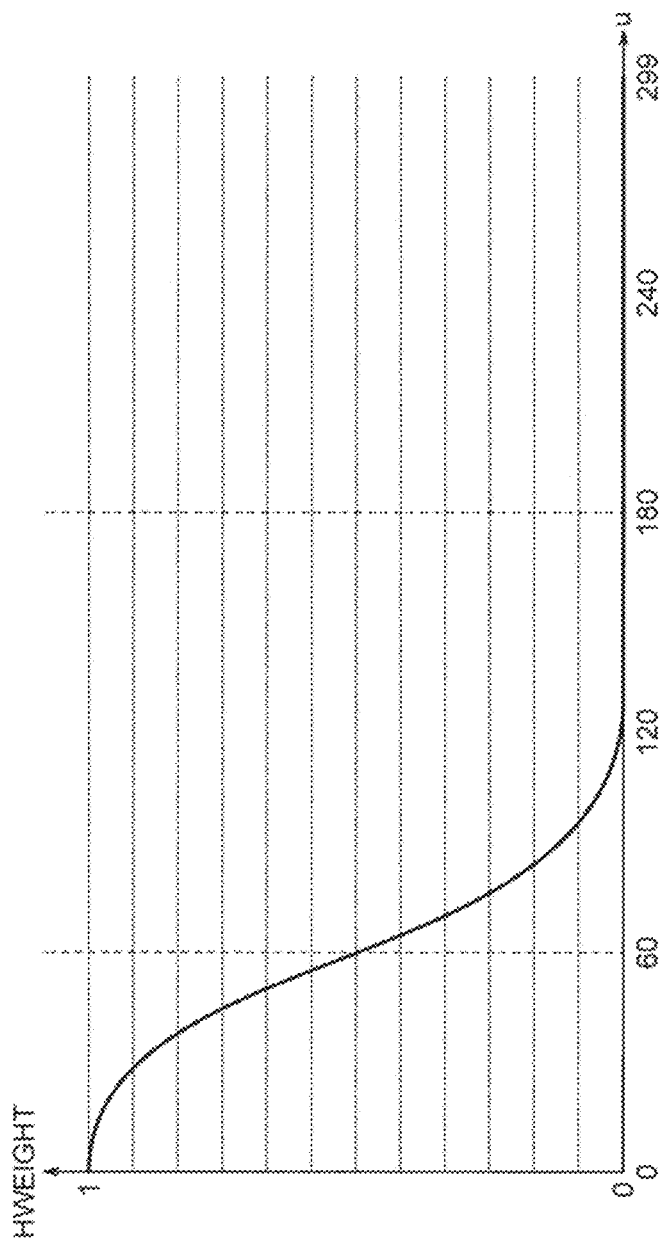
FIG. 11 is a graph illustrating an example of a light distribution curve represented by a light distribution table used in a second embodiment of the present invention.

FIG. 11 illustrates an example of the light distribution in the horizontal direction represented by the light distribution table LDT used in the second embodiment. In the illustrated light distribution, the effect of the illumination light from each region reaches a middle of an adjacent region (i.e., a middle point of the adjacent region). In FIG. 11, the horizontal axis represents the horizontal position u, and the vertical axis represents the effect coefficient HWEIGHT. The horizontal position u has its origin at a center of the lighted region.

Also in the example of FIG. 11, the size of one region is 120 pixels, and the points at values 60 and 180 on the horizontal axis correspond to boundaries between regions.

In the example of FIG. 11, the HWEIGHT(u) is defined for u in the range of 0 to 119.

Also in the example of FIG. 11, the horizontal position is represented by the number of pixels, it may be represented by a value corresponding to the number of pixels other than the number of pixels.

Since it is a distribution extending to a middle of an adjacent region, HWEIGHT(u) is zero in the range of greater than 120 on the horizontal axis. However, for comparison to FIG. 6, FIG. 11 illustrates also the range of greater than 120.

Also, although FIG. 11 takes 1 as the maximum value on the vertical axis, a value convenient for calculation on a digital circuit may be taken as with FIG. 6.

The distribution in the vertical direction represented by the light distribution table is the same as the distribution illustrated in FIG. 11. However, the vertical position is denoted by v, and the effect coefficient is denoted by VWEIGHT(v). The vertical position v has its origin at the center of the lighted region. The effect coefficient VWEIGHT(v) is defined for v in the range of 0 to 119, as with HWEIGHT(u).

The following assumes that the light distributions for all the regions can be represented by the same table, as with the first embodiment.

Figures 12, 13:
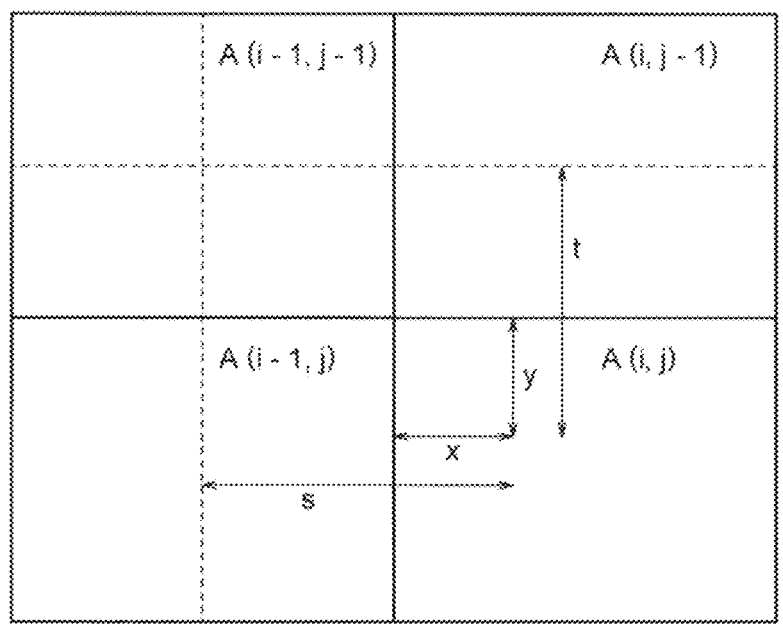
FIG. 12 is a diagram illustrating peripheral regions referred to in generation of conversion information for a pixel in each region in the second embodiment.
FIG. 13 is a diagram illustrating a way of representing a position of a pixel in a region in the second embodiment.

In a case where the light distribution is as illustrated in FIG. 11, when the effect value calculator 631 calculates the luminance effect value for a pixel of each region A(i,j), the light source control values for 3×3 regions A(i−1,j−1) to A(i+1,j+1) centered on the region A(i,j) are used, as illustrated in FIG. 12.

Similarly, when the color conversion information generator 65 calculates the color conversion values for a pixel of each region A(i,j), the color shift information, e.g., the color shift correction amounts, for 3×3 regions A(i−1,j−1) to A(i+1,j+1) centered on the region A(i,j) is used, as illustrated in FIG. 12.

In more detail, each region is divided into four sections Sa to Sd by a vertical line and a horizontal line that pass through a center of the region, and the light source control values used for calculation of the luminance effect value and the color shift information used for calculation of the color conversion values depend on in which of the four sections in the region (region of interest) to which the pixel of interest belongs the pixel of interest is located.

Specifically, when the pixel of interest is located in the left upper section Sa of the region of interest A(i,j), the light source control values or color shift information for the region of interest A(i,j), the region A(i−1,j−1) located to the left of and above the region of interest, the region A(i,j−1) located above the region of interest, and the region A(i−1,j) located to the left of the region of interest are used.

When the pixel of interest is located in the right upper section Sb of the region of interest A(i,j), the light source control values or color shift information for the region of interest A(i,j), the region A(i,j−1) located above the region of interest, the region A(i+1,j−1) located to the right of and above the region of interest, and the region A(i+1,j) located to the right of the region of interest are used.

When the pixel of interest is located in the left lower section Sc of the region of interest A(i,j), the light source control values or color shift information for the region of interest A(i,j), the region A(i−1,j) located to the left of the region of interest, the region A(i−1,j+1) located to the left of and blow the region of interest, and the region A(i,j+1) located below the region of interest are used.

When the pixel of interest is located in the right lower section Sd of the region of interest A(i,j), the light source control values or color shift information for the region of interest A(i,j), the region A(i+1,j) located to the right of the region of interest, the region A(i,j+1) located below the region of interest, and the region A(i+1,j+1) located to the right of and below the region of interest are used.

Also, the coordinates representing the pixel position used in calculation of the luminance effect value and color conversion values are changed depending on in which of the four sections of the region of interest the pixel of interest is located. This is for convenience of calculation.

Specifically, when the pixel of interest is located in the left upper section Sa of the region of interest A(i,j), as illustrated in FIG. 13, two-dimensional coordinates (s,t) with its origin at a center of the region A(i−1,j−1) located to the left of and above the region of interest are used, where s denotes the horizontal position, and t denotes the vertical position.

The following relationship exists between (x,y) and (s,t):

$$s = x + 60, \quad (18a)$$

$$t = y + 60. \quad (18b)$$

The above (s,t) coincides with the relative position (u,v) relative to the center of the region A(i−1,j−1) located to the left of and above the region of interest A(i,j).

That is, the following relationship exists:

$$u = s,$$

$$v = t.$$

Meanwhile, the following relationship exists between the above (s,t) and the relative position (u,v) relative to the center of the region of interest A(i,j):

$$u = 119 - s,$$

$$v = 119 - t.$$

Also, the following relationship exists between the above (s,t) and the relative position (u,v) relative to the center of the region A(i,j−1) located above the region of interest A(i,j):

$$u = 119 - s$$

$$v = t.$$

Also, the following relationship exists between the above (s,t) and the relative position (u,v) relative to the center of the region A(i−1,j) located to the left of the region of interest A(i,j):

$$u = s,$$

$$v = 119 - t.$$

When the pixel of interest is located in the right upper section Sb in the region of interest A(i,j), two-dimensional coordinates (s,t) with its origin at a center of the region A(i+1,j−1) located to the right of and above the region of interest are used.

Similarly, when the pixel of interest is located in the left lower section Sc in the region of interest A(i,j), two-dimensional coordinates (s,t) with its origin at a center of the region A(i−1,j+1) located to the left of and below the region of interest are used.

Similarly, when the pixel of interest is located in the right lower section Sd in the region of interest A(i,j), two-dimensional coordinates (s,t) with its origin at a center of the region A(i+1,j+1) located to the right of and below the region of interest are used.

The following describes calculation of the luminance effect value and color conversion values for a pixel located in the left upper section Sa of the region A(i,j) of FIG. 12.

In this case, the coordinates (x,y) representing the pixel position are converted to coordinates (s,t) by calculation shown in Equations (18a) and (18b), for example. This conversion is performed in the effect value calculator 631 and color conversion information generator 65.

For each of the multiple reference regions, the effect value calculator 631 determines the relative position (u,v) of the pixel of interest relative to the reference region, on the basis of the coordinates (s,t) obtained by the conversion as described above or the original coordinates (x,y).

By referring to the light distribution table LDT with the determined relative position (u,v), the effect value calculator 631 determines the effect coefficients HWEIGHT and VWEIGHT for the reference region.

When the pixel of interest is located in the section Sa in the region A(i,j) as described above, the regions A(i−1,j−1), A(i,j−1), A(i−1,j), and A(i,j) are determined as the reference regions, and the relative positions relative to the respective reference regions are determined.

The effect value calculator 631 determines the sum BB(s,t) of the effects from the light source control values BL(i−1,j−1), BL(i,j−1), BL(i−1,j), and BL(i,j) for the determined regions.

The effect value calculator 631 determines sums of effects in the horizontal direction at different positions in the vertical direction by performing product-sum operations by using the light source control values for the multiple reference regions arranged in the horizontal direction at the different positions in the vertical direction and the effect coefficients HWEIGHT representing the distribution in the horizontal direction of the light distribution table LDT.

The sum VB(j−1) of the effects on a pixel at a horizontal position of s (=60+x) in the region A(i,j−1) due to a group of the regions at a vertical position of (j−1), i.e., the regions A(i−1,j−1) and A(i,j−1) is calculated by the following Equation (19):

$$VB(j-1) = BL(i-1,j-1) * H\text{WEIGHT}(s) + BL(i,j-1) * H\text{WEIGHT}(119-s). \quad \text{Equation (19)}$$

Similarly, for a group of the regions at a vertical position of (j), the sum VB(j) of the effects is determined by the following Equation (20):

$$VB(j) = BL(i-1,j) * H\text{WEIGHT}(s) + BL(i,j) * H\text{WEIGHT}(119-s). \quad \text{Equation (20)}$$

The sum BB(s,t) of the effects due to the four regions is determined by performing a product-sum operation by using the sums VB(j−1) and VB(j) of the effects calculated as described above and the effect coefficients VWEIGHT representing the distribution in the vertical direction of the light distribution table, as shown in the following Equation (21):

$$BB(s,t) = V(j-1) * V\text{WEIGHT}(t) + V(j) * V\text{WEIGHT}(119-t). \quad \text{Equation (21)}$$

By performing conversion from the coordinates (s,t) to the coordinates (x,y) by using the above relationship of Equations (18a) and (18b), BB(x,y) can be obtained from BB(s,t).

The sum BB(x,y) of the effects thus obtained is the sum of the effects on the brightness at the position (x,y) in the left upper section Sa of the region A(i,j) due to the illumination light from the region, the left upper region, the upper region, and the left region, and is referred to as a luminance effect value.

Also for the pixels in the sections Sb, Sc, and Sd, the luminance effect value BB(x,y) can be determined by the same calculation as described above.

The luminance conversion value calculator 632 determines the luminance conversion value YS(x,y) from the luminance effect value BB(x,y) through the same process as the luminance conversion value calculator 632 of the first embodiment.

The luminance conversion value YS(x,y) is supplied as the luminance conversion information to the converter 17.

For each of the multiple reference regions, the color conversion information generator 65 determines the relative position (u,v) of the pixel of interest relative to the reference region, on the basis of the coordinates (s,t) obtained by the conversion as described above or the original coordinates (x,y).

By referring to the light distribution table LDT with the determined relative position (u,v), the color conversion information generator 65 determines the effect coefficients HWEIGHT and VWEIGHT for the reference region.

When the pixel of interest is located in the section Sa in the region A(i,j) as described above, the regions A(i−1,j−1), A(i,j−1), A(i−1,j), and A(i,j) are determined as the reference regions, and the relative positions relative to the respective reference regions are determined.

The color conversion information generator 65 determines the sums of the effects of the color shifts at the position of the pixel of interest from the color shift correction amounts for the determined reference regions.

A process of determining the sum CCR(s,t) of the effects of the color shifts of red from the red color shift correction amounts CSR(i−1,j−1), CSR(i,j−1), CSR(i−1,j), and CSR(i, j) will be first described.

The color conversion information generator 65 determines the sums of the effects of the color shifts in the horizontal direction at different positions in the vertical direction by performing product-sum operations by using the color shift correction amounts for the multiple reference regions arranged in the horizontal direction at the different positions in the vertical direction and the effect coefficients HWEIGHT representing the distribution in the horizontal direction of the light distribution table LDT.

The sum VCSR(j−1) of the effects on a pixel at a horizontal position of s in the region A(i,j−1) due to the color shifts of a group of the regions at a vertical position of (j−1), i.e., the regions A(i−1,j−1) and A(i,j−1) is calculated by the following Equation (22):

$$VCSR(j-1)=CSR(i-1,j-1)*HWEIGHT(s)+ CSR(i,j-1)*HWEIGHT(119-s).\qquad \text{Equation (22)}$$

Similarly, for a group of the regions at a vertical position of (j), the sum VCSR(j) of the effects is determined by the following Equation (23):

$$VCSR(j)=CSR(i-1,j)*HWEIGHT(s)+ CSR(i,j)*HWEIGHT(119-s).\qquad \text{Equation (23)}$$

The sum CCR(s,t) of the effects due to the four regions is determined by performing a product-sum operation by using the sums VCSR(j−1) and VCSR(j) of the effects calculated as described above and the effect coefficients VWEIGHT representing the distribution in the vertical direction of the light distribution table, as shown in the following Equation (24):

$$CCR(s,t)=VCSR(j-1)*VWEIGHT(t)+ VCSR(j)*VWEIGHT(119-t).\qquad \text{Equation (24)}$$

Also for blue, in the same manner as described above, the sum CCB(s,t) of the effects is determined by the following Equations (25), (26), and (27):

$$VCSB(j-1)=CSB(i-1,j-1)*HWEIGHT(s)+ CSB(i,j-1)*HWEIGHT(119-s),\qquad \text{Equation (25)}$$

$$VCSB(j)=CSB(i-1,j)*HWEIGHT(s)+ CSB(i,j)*HWEIGHT(119-s),\qquad \text{Equation (26)}$$

$$CCB(s,t)=VCSB(j-1)*VWEIGHT(t)+ VCSB(j)*VWEIGHT(119-t).\qquad \text{Equation(27)}$$

A process of obtaining CCR(x,y) and CCB(x,y) from CCR(s,t) and CCB(s,t) by coordinate conversion is performed by using the relationship of Equations (18a) and (18b) in the same manner as in the case of the sum BB of the effects.

The sums CCR(x,y) and CCB(x,y) of the effects thus obtained are the sums of the effects at the position (x,y) in the left upper section Sa of the region A(i,j) due to the color shifts of the illumination light from the region, the left upper region, the upper region, and the left region.

Also for the pixels in the sections Sb, Sc, and Sd, the sums CCR(x,y) and CCB(x,y) of the effects can be determined by the same calculation as described above.

The sums CCR(x,y) and CCB(x,y) of the effects are supplied as the color conversion information to the converter 17.

The color converter 71 performs color conversion on the image signal by using the color conversion values CCR(x,y) and CCB(x,y) supplied from the color conversion information generator 65, as with the first embodiment.

The luminance converter 72 performs luminance conversion on the image signal by using the luminance conversion value YS(x,y) supplied from the luminance conversion information generator 63, as with the first embodiment.

In this embodiment, by reducing the range of the light distribution, the light distribution table LDT is reduced, and the circuit size of the luminance conversion information generator 63 and color conversion information generator 65 can be reduced.

When the range of the effect of the illumination light from each region extends to a middle of an adjacent region as in this embodiment, it is preferable that HWEIGHTSUM calculated by the following Equation (28) instead of the above Equation (12) be constant for any value of s=0 to 59, and the value VWEIGHTSUM calculated by the following Equation (29) instead of the above Equation (13) be constant for any value of t=0 to 59, in terms of eliminating luminance unevenness:

$$HWEIGHTSUM=HWEIGHT(s)+HWEIGHT(119-s),\qquad \text{Equation (28)}$$

$$VWEIGHTSUM=VWEIGHT(t)+VWEIGHT(119-t).\qquad \text{Equation (29)}$$

Moreover, when the light distribution curve illustrated in FIG. 11 is point symmetrical with respect to the region boundary (in the vicinity of 60 on the horizontal axis in the drawing), since Equation (28) is constant for any value of s=0 to 59 and Equation (29) is constant for any value of t=0 to 59, it is preferable in terms of eliminating luminance unevenness.

Moreover, when the light distribution curve illustrated in FIG. 11 is point symmetrical with respect to the region boundary (in the vicinity of 60 on the horizontal axis in the drawing), the light distribution table LDT can be halved, and thus the circuit size can be reduced.

For example, when HWEIGHT(u) is defined for u in the range of 0 to 59, the effect coefficient for u in the range of 60 to 119 can be obtained by taking advantage of the relationship of the following Equation (30):

$$H\text{WEIGHT}(119-u)=1-H\text{WEIGHT}(u). \quad \text{Equation (30)}$$

The same applies to VWEIGHT(v).

While in the first embodiment, it has been assumed that the effect of the illumination light from each region reaches regions adjacent to adjacent regions, in the second embodiment, it has been assumed that the effect of the illumination light from each region reaches middles of adjacent regions. Then, it has been described that when the range assumed to be affected by the illumination light is small, the calculation is simple, which is advantageous for circuit size reduction.

The extent of the range assumed to be affected by the illumination light from each region, conversely the number of regions assumed to affect the brightness at the position of a pixel in each region, depends on various conditions.

Naturally, in determining the number of regions assumed to have effects, it is necessary to take into account a light distribution determined by characteristics of light emitting elements, the optical structure of the display panel, or the like.

However, when it is sufficient that the correction of the image signal be approximately performed, from this viewpoint, the number of regions assumed to have effects can be controlled.

As the number of regions assumed to have effects increases, the color changes at the boundary portions between the regions become less noticeable.

By reducing the number of regions assumed to have effects, it is possible to reduce the circuit size and also improve the effect of local dimming.

Thus, the number of regions assumed to have effects should be determined in view of various conditions, such as the use of the display device.

The various conditions described here include the content of the displayed content (such as whether it is rich in moving images or still images), the required image quality, and the like.

Also, the number of regions assumed to have effects may be different between the generation of the color conversion information and the generation of the luminance conversion information.

For example, it is possible that in generating the luminance conversion information, 25 regions are assumed to have effects, and in generating the color conversion information, 9 regions are assumed to have effects. In this case, a light distribution table used for generation of the luminance conversion information and a light distribution table used for generation of the color conversion information represent light distributions having different ranges.

Such a configuration may be preferable since, from the fact that difference in color is less perceived by the human eye than difference in luminance, even when the color conversion information is generated by a relatively simple calculation as described above, in many cases, a quite satisfactory result is obtained.

Also, the number of regions to be taken into account may depend on the number of divisions of the backlight. For example, in a backlight using mini-LEDs or the like, the number of divided regions is large, and even when the spatial range of the light distribution is small, the number of affected regions may be large.

Third Embodiment

Figure 14:
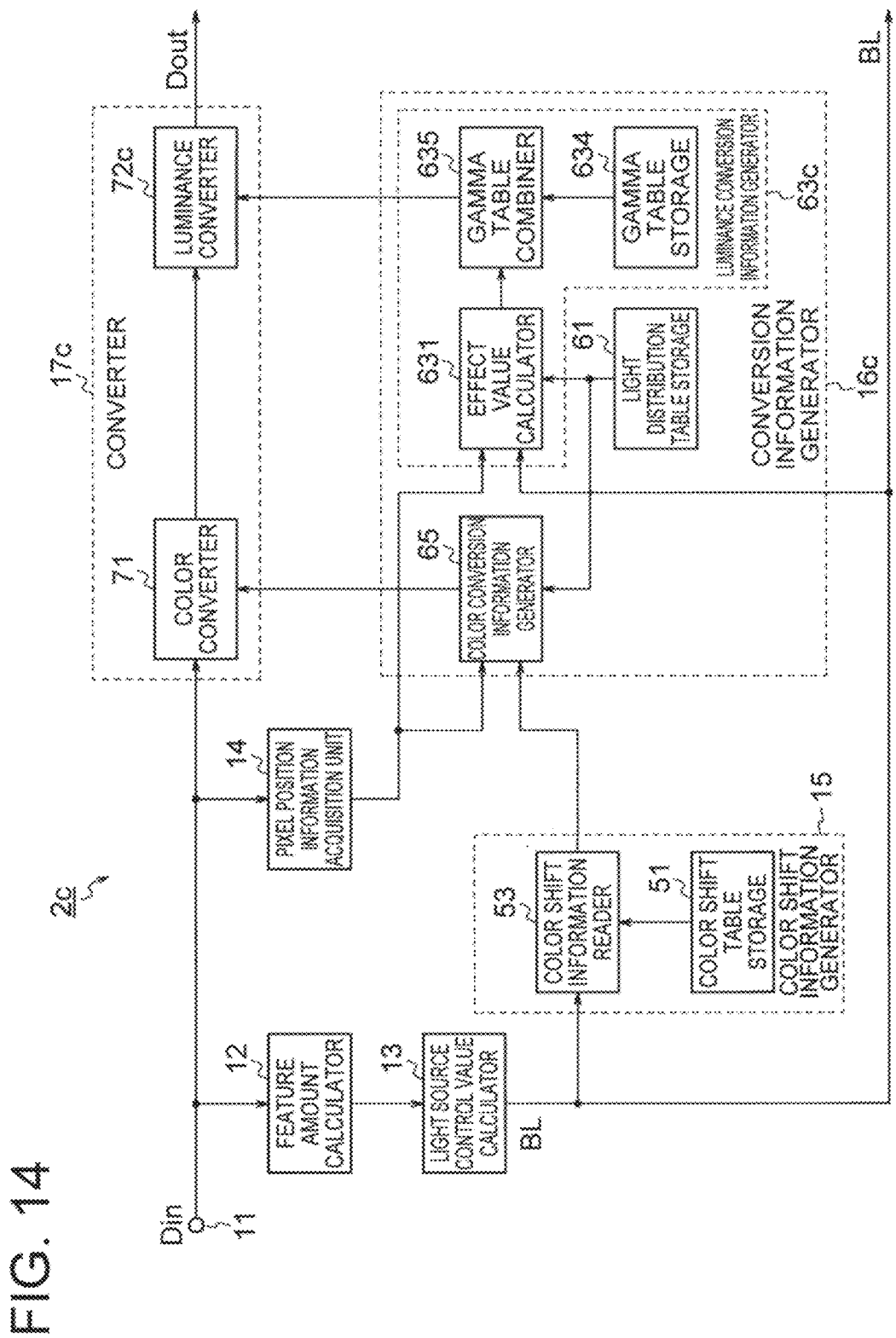
FIG. 14 is a functional block diagram illustrating a configuration of a display control device of a third embodiment of the present invention.

FIG. 14 is a functional block diagram illustrating a configuration of a display control device 2c of a third embodiment of the present invention.

The display control device 2c illustrated in FIG. 14 is generally the same as the display control device 2 illustrated in FIG. 3, but it includes a conversion information generator 16c and a converter 17c instead of the conversion information generator 16 and converter 17.

The conversion information generator 16c is generally the same as the conversion information generator 16 of FIG. 3, but it includes a luminance conversion information generator 63c instead of the luminance conversion information generator 63.

The luminance conversion information generator 63c includes an effect value calculator 631, a gamma table storage 634, and a gamma table combiner 635.

The converter 17c is generally the same as the converter 17 of FIG. 3, but it includes a luminance converter 72c instead of the luminance converter 72.

The effect value calculator 631 is the same as the effect value calculator 631 of FIG. 3, and calculates the luminance effect value BB(x,y).

The gamma table storage 634 stores multiple gamma tables GMT(0) to GMT(N). Here, N is a natural number of 1 or more, and the number of stored tables is N+1.

The following describes a case where N is 16.

Figure 15:
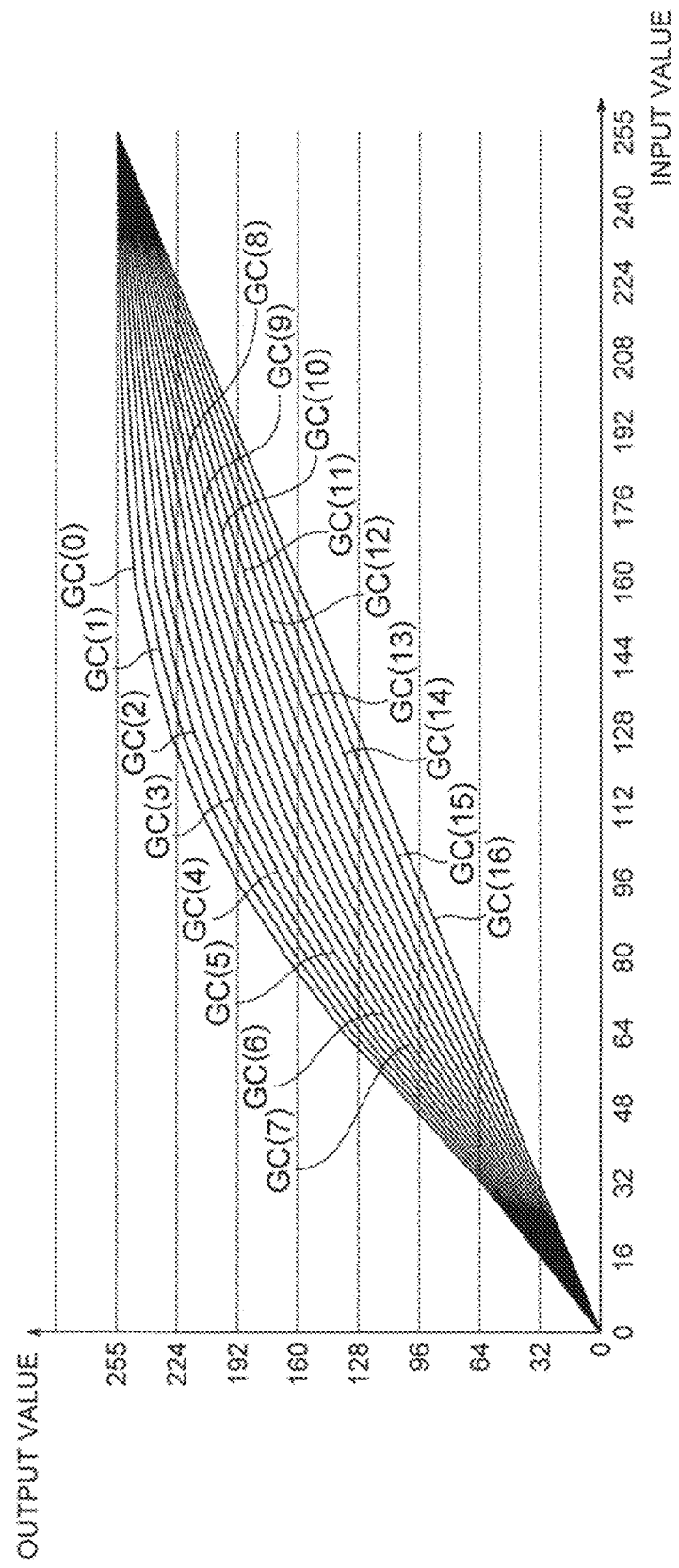
FIG. 15 is a diagram illustrating an example of a set of gamma curves represented by multiple gamma tables used in the third embodiment.

FIG. 15 illustrates an example of a set of gamma curves GC(0) to GC(16) represented by the gamma tables GMT(0) to GMT(16).

In FIG. 15, the horizontal axis represents the input value, and the vertical axis represents the output value.

It is assumed that the input value and output value are represented by 8-bit digital signals.

In the example illustrated in FIG. 15, the gamma curves GC(0) to GC(16) are such that gamma curves whose numbers (numbers in parentheses) are smaller are more convex upward, and gamma curves whose numbers are larger are more linear.

Specifically, when the gamma curves GC are approximated by $$\text{(Output Value)}=\text{(Constant)}\times\text{(Input Value)}^{1/\gamma}, \quad \text{Equation (31)}$$

where γ is a positive value, γ increases as the number of the gamma curve decreases.

When the gamma curve is convex upward, in a range in which the input value is small, the gain is relatively large, and the contrast is high.

The gamma table combiner 635 selects, from the multiple gamma tables GMT(0) to GMT(N), two gamma tables GMT(n−1) and GMT(n) whose numbers are adjacent, depending on the luminance effect value BB(x,y) calculated by the effect value calculator 631, where n is one of 1 to N.

The gamma table combiner 635 combines the selected two gamma tables (the pair of the gamma tables) GMT(n−1) and GMT(n) to generate a combined gamma table GST(x,y).

In the selection of the two gamma tables GMT(n−1) and GMT(n) based on the luminance effect value BB(x,y), as the luminance effect value BB(x,y) increases, the numbers of the selected gamma tables increase.

Specifically, the range of the values that can be taken by the luminance effect value BB(x,y) is divided into 16 divisions, a pair of gamma tables is assigned to each of the 16 divisions, and depending on the division to which the luminance effect value for each pixel belongs, the corresponding (assigned) pair of gamma tables is selected.

The combination of the selected two gamma tables is performed by taking a weighted average of the output values corresponding to the same input value as an output value of the combined gamma table. In the weighted average, the weights are determined on the basis of the position occupied by the luminance effect value for each pixel in the division to which the luminance effect value belongs (the differences from the luminance effect values at both ends of the division).

The combination of gamma tables will be described below in more detail by using an example.

Here, it is assumed that the number of table points of each gamma table is 16, and one table point is provided for every consecutive 16 (16=256/16) input values. Specifically, since the input value is 8-bit, the table points are provided to the input values 16, 32, 48, . . . .

Also, here, it is assumed that the luminance effect value BB(x,y) is represented by 10 bits, and the range of the values that can be taken by the luminance effect value BB(x,y) is from 0 to 1023. In this case, for the luminance effect value BB(x,y) for each pixel, to which of the 16 divisions the luminance effect value BB(x,y) belongs is determined on the basis of the upper 4 bits of the luminance effect value BB(x,y), and the pair of gamma tables associated with the division is selected. Then, for the luminance effect value BB(x,y), on the basis of its lower 6 bits, the position in the division to which it belongs is determined, and the weights used in the weighted average are determined.

For example, when BB(x,y) is 700, the value (decimal number) represented by the upper 4 bits of BB(x,y) is 10, and the value represented by the lower 6 bits is 60.

Since the value represented by the upper 4 bits is 10, it is determined to belong to the 11th division, and the gamma tables GMT(10) and GMT(11) associated with the division are selected.

Also, on the basis of 60 represented by the lower 6 bits, it is determined that the weight for the gamma table GMT(10) is 60/64, and the weight for the gamma table GMT(11) is (64−60)/64.

By using these weights, for each table point, the output value of the combined gamma table GST(s) is determined by weighting and adding the output values of the two gamma tables GMT(10) and GMT(11), as shown in the following Equations (32-1) to (32-p).

For the 1st table point, Equation (32-1)

$GST(x, y)(1) =$ $\{GMT(10)(1) * (64 - 60) + GMT(11)(1) * 60\}/64.$

For the 2nd table point, Equation (32-2)

$GST(x, y)(2) =$ $\{GMT(10)(2) * (64 - 60) + GMT(11)(2) * 60\}/64.$

For the 3rd table point, Equation (32-3)

$GST(x, y)(3) =$ $\{GMT(10)(3) * (64 - 60) + GMT(11)(3) * 60\}/64.$

...

For the 16th table point, Equation (32-16)

$GST(x, y)(16) =$ $\{GMT(10)(16) * (64 - 60) + GMT(11)(16) * 60\}/64.$

In general, for p- Equation (32-p)

th (p being one of 1 to 16) table point, $GST(x, y)(p) =$ $\{GMT(10)(p) * (64 - 60) + GMT(11)(t) * 60\}/64.$ The combined gamma table GST(x,y) including the combined values GST(x,y) (1) to GST(x,y) (16) thus determined is supplied as the luminance conversion information to the converter 17c.

In the above example, each of the gamma tables GMT(0) to GMT(16) is constituted by 16 points. However, the number of table points constituting each gamma table may be other than 16. For example, it may be 8 or 256.

In the above example, to which division the luminance effect value BB belongs is determined on the basis of the value of the luminance effect value BB, and the gamma table pair associated with the division is selected. However, when the value of the luminance effect value BB is located at a boundary between divisions, it is possible to select one gamma table for the luminance effect value BB and output the selected gamma table as the "combined gamma table". For example, in the above example, when the lower 6 bits of the luminance effect value BB(x,y) is 0, one of the gamma table pair assigned to the division corresponding to the upper 4 bits whose number is the smaller may be selected.

In short, the gamma table combiner 635 may be any that selects one or two of the multiple gamma tables stored in the gamma table storage 634, and when one gamma table is selected, simply outputs the selected gamma table as a combined gamma table, and when two gamma tables are selected, generates a combined gamma table by combining the selected two gamma tables and outputs the generated combined gamma table.

The luminance converter 72c of the converter 17c performs luminance conversion on the image signal by using the luminance conversion information.

The combined gamma table output by the gamma table combiner 635 is generated by combination based on BB(x,y) as described above, and thus is generated for each pixel.

For example, the luminance converter 72c refers to the combined gamma table input from the gamma table combiner 635 with the largest value of the R, G, and B image signals for the same pixel (the largest value for the same pixel) MAX(R,G,B), and determines a ratio of the output value to the input value from the combined gamma table.

Specifically, in the combined gamma table referred to, the output value corresponding to an input value equal to the largest value MAX(R,G,B) is determined, and a ratio of the output value to the input value is determined.

The luminance converter 72c uses the determined ratio as the luminance conversion value YS(x,y) in Equations (17R), (17G), and (17B), and multiplies RC(x,y), GC(x,y), and BC(x,y) by the ratio.

In this case, RC(x,y), GC(x,y), and BC(x,y) are multiplied by the same ratio.

Alternatively, for each of the R, G, and B image signals for the same pixel, the luminance converter 72c may refer to the combined gamma table input from the gamma table combiner 635 and determine ratios of the output values to the input values in the combined gamma table.

Specifically, in the combined gamma table referred to, for each of the R, G, and B image signals, a ratio of the output value corresponding to an input value equal to the value of the image signal to the input value may be determined.

In this case, the determined ratios are used as the luminance conversion values YS(x,y) in the respective Equations (17R), (17G), and (17B), and multiplied with RC(x,y), GC(x,y), and BC(x,y).

In this case, the separately determined ratios are multiplied with RC(x,y), GC(x,y), and BC(x,y).

When the combined gamma table has one table point for every multiple input values, for an input value that does not coincide with any table point, table points near the input value are taken as reference values, and an interpolation is performed by using the output values corresponding to the reference values. The interpolation can be performed by determining a weighted average of the output value corresponding to the table point (a first reference value) that is larger than the input value and is the closest to the input value and the output value corresponding to the table point (a second reference value) that is smaller than the input value and is the closest to the input value.

For example, when the gamma table has 16 table points as described above, depending on the number of bits of the input image signal (the largest value of R, G, and B, or the value of each of R, G, and B), the output value is calculated by determining the reference values of the gamma table on the basis of upper bits and determining the weights for the weighted average on the basis of the remaining lower bits. For example, when the input image signal is 8-bit, the reference values of the gamma table are determined by the upper 4 bits, and the weights for the weighted average are determined by the lower 4 bits.

Figure 16:
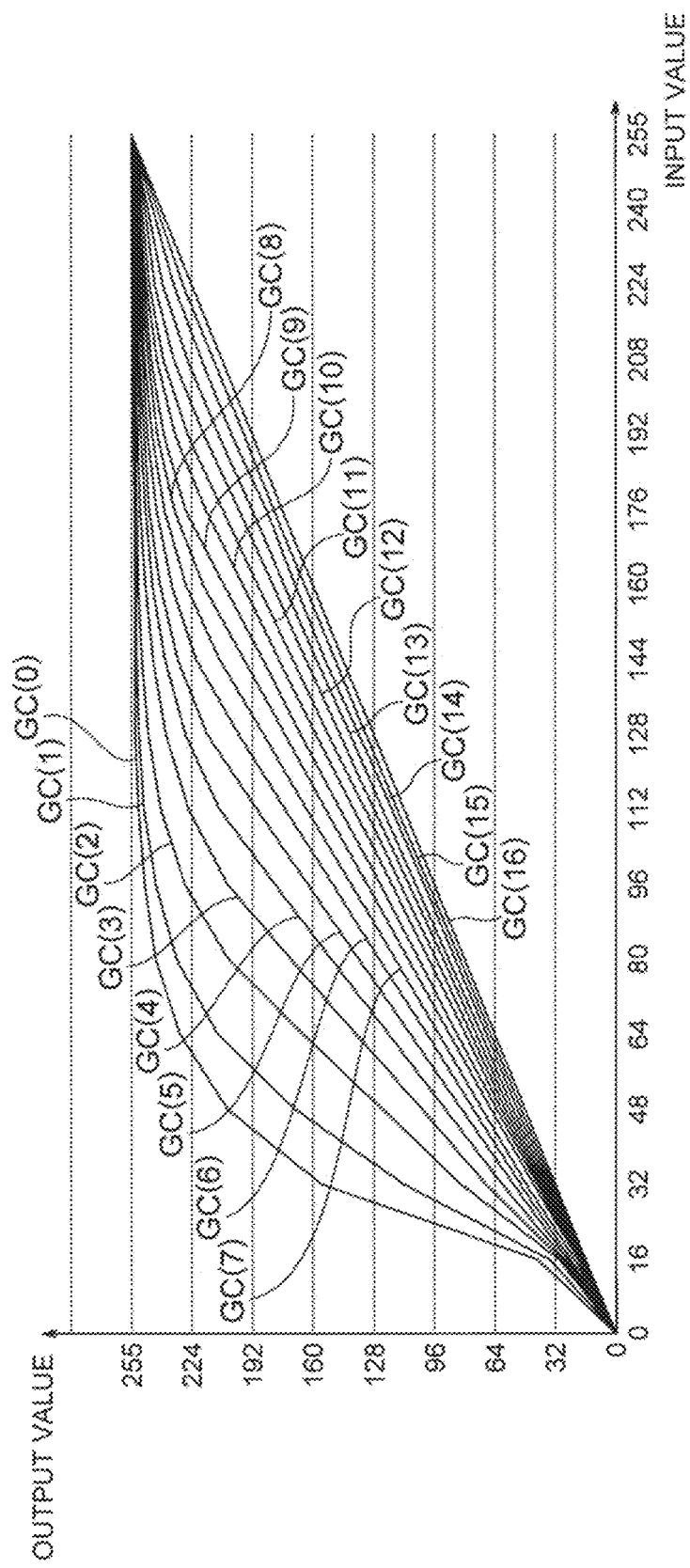
FIG. 16 is a diagram illustrating another example of the set of the gamma curves represented by the multiple gamma tables used in the third embodiment.

FIG. 16 illustrates another example of the set of the gamma curves GC(0) to GC(16) represented by the gamma tables GMT(0) to GMT(16). The tendency that gamma curves of the gamma curves GC(0) to GC(16) having smaller numbers have larger gains in a region in which the input value is small is stronger in FIG. 16 than in FIG. 15.

By using the set of gamma curves illustrated in FIG. 15 or 16, it is possible to make tone jump, noise, or the like less noticeable in portions in which the input value is small, i.e., dark portions of the image, and provide a bright high-contrast image.

Such effects can be enhanced by using the set of gamma curves illustrated in FIG. 16.

Fourth Embodiment

A configuration of a display control device of a fourth embodiment of the present invention is the same as that of the display control device 2 of the first embodiment illustrated in FIG. 3, but the light distribution table LDT stored in the light distribution table storage 61 differs in content from that in the first embodiment, and the processes in the luminance conversion information generator 63 and color conversion information generator 65 differ in content from those in the first embodiment.

In the first embodiment, the light distribution table LDT has table values indicating the effect coefficient for each of the pixels arranged in the horizontal direction or vertical direction. However, in this embodiment, the light distribution table LDT has one table value for every multiple consecutive pixels of the pixels arranged in the horizontal direction or vertical direction. For example, it has one table value for every four consecutive pixels. An example of such a table is illustrated in FIG. 17.

In the example illustrated in FIG. 17, a table value is stored for each of the positions of u=0, 4, 8, . . . .

For example, in the first embodiment, the size of one region of the backlight is 120 pixels, and the light distribution table having a table value for each pixel is used. Since the effect of the illumination light from each region extends to the regions adjacent to the adjacent regions, the light distribution table LDT has 300 table points to represent the distribution in the horizontal direction and 300 table points to represent the distribution in the vertical direction.

On the other hand, in this embodiment, since the light distribution table LDT has one table point for every four consecutive pixels, the number of table points in each of the horizontal and vertical directions is 75.

The effect value calculator 631 of the luminance conversion information generator 63 and the color conversion information generator 65 perform interpolation of an effect coefficient as needed in performing the product-sum operations.

Specifically, the effect value calculator 631 and color conversion information generator 65 refers to the light distribution table LDT on the basis of the relative position determined from the pixel position information indicating the position of the pixel of interest from the pixel position information acquisition unit 14, as with the first embodiment. Then, when a table value is defined for the position of the pixel of interest, the table value is used as the effect coefficient for the position of the pixel of interest. When no table value is defined for the position of the pixel of interest, i.e., when the pixel of interest is located at a position that does not coincide with any of the table points, the effect coefficient for the pixel of interest is calculated by interpolation using the effect coefficients for the table points.

The above interpolation can be performed by weighting and adding the effect coefficients for table points located near the pixel of interest. In the weighted addition, a greater weight may be used as the distance between the pixel of interest and the table point decreases.

For example, when the pixel position information is represented by 7 bits, table points located near the pixel of interest are determined by the upper 5 bits, the weights are determined by the lower 2 bits, and a weighted average is performed.

The effect value calculator 631 calculates the luminance effect value BB by using the effect coefficients determined as above.

The color conversion information generator 65 calculates the color conversion information CCR and CCB by using the effect coefficients determined as above.

Although the above describes a case in which one table point is located for every 4 pixels, it is not limited to 4, and it is sufficient that a table point be located for every multiple pixels. Also, it is not necessary that a table point be located for every an integer number of pixels. It is sufficient that table points be located at intervals greater than the distance between adjacent pixels.

In this embodiment, table points are located at intervals greater than the distance between adjacent pixels. Thus, since fewer table points are required, the size of the light distribution table can be reduced.

Fifth Embodiment

Figure 18:
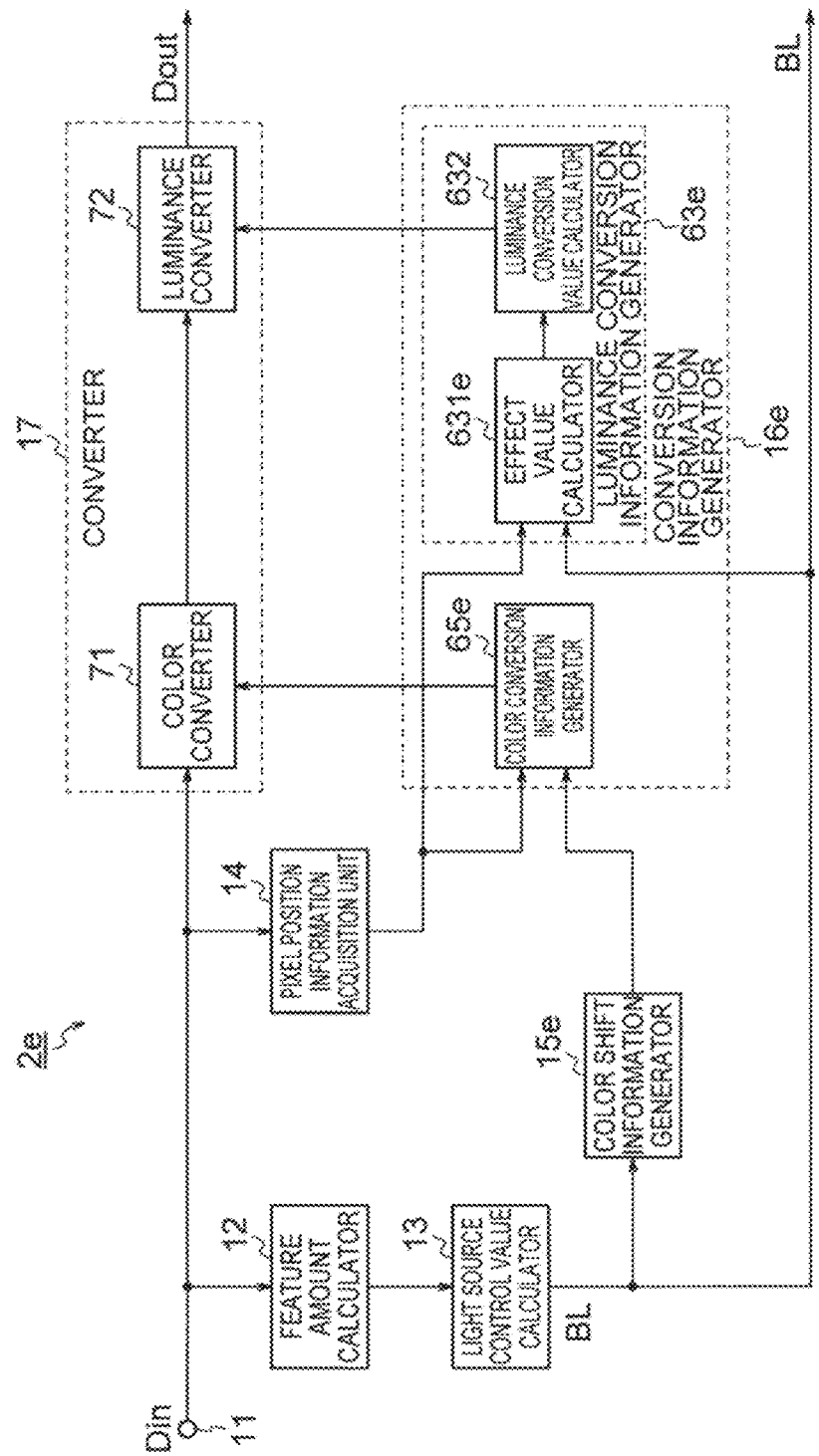
FIG. 18 is a functional block diagram illustrating a configuration of a display control device of a fifth embodiment of the present invention.

FIG. 18 is a functional block diagram illustrating a configuration of a display control device 2e of a fifth embodiment of the present invention.

The display control device 2e of FIG. 18 is generally the same as the display control device 2 of the first embodiment illustrated in FIG. 3, but is provided with a color shift information generator 15e and a conversion information generator 16e instead of the color shift information generator 15 and conversion information generator 16.

The color shift information generator 15e will be first described.

While the color shift information generator 15 of the first embodiment includes the color shift table, the color shift information generator 15e of this embodiment generates the color shift information by calculation without using the color shift table. The color shift information indicates, for example, color shift correction amounts.

Specifically, the color shift information generator 15e performs calculation of predetermined formulae on the light source control value BL(i,j) for each region input from the light source control value calculator 13, thereby determining the color shift correction amounts CSR(i,j) and CSB(i,j) for the region.

As the above calculation formulae, for example, the following Equations (33R) and (33B) are used:

$$CSR(i,j)=\{1-BL(i,j)\}*RK+1, \quad \text{Equation (33R)}$$

$$CSB(i,j)=\{1-BL(i,j)\}*BK+1. \quad \text{Equation (33B)}$$

The color shift correction amounts CSR(i,j) and CSB(i,j) represented by these Equations (33R) and (33B) correspond to values obtained by approximating the curves representing the color shift correction amounts CSR and CSB in FIG. 5 with straight lines.

RK and BK are predetermined constants corresponding to the slopes of the straight lines approximating the curves representing the color shift correction amounts CSR and CSB in FIG. 5, respectively. In the example of FIG. 5, RK is a positive value, and BK is a negative value.

BL denotes the light source control value. While in FIG. 5, BL is represented in percentage, BL in Equations (33R) and (33B) is a value with 1 as the maximum value (reference value).

As aforementioned, it is known that change in color is less perceived by the human eye than change in luminance, and in some cases, even when the color shift correction amounts are determined by relatively simple calculations such as Equations (33R) and (33B), a quite satisfactory result is obtained without the color shift being perceived by a person.

The conversion information generator 16e will be described.

While the conversion information generator 16 of the first embodiment includes the light distribution table, the conversion information generator 16e of this embodiment determines effect coefficients by performing calculation according to predetermined calculation formulae on the pixel position information for the pixel, instead of using the light distribution table, and generates the luminance conversion information and color conversion information by using the determined effect coefficients.

The above predetermined calculation formulae approximate the light distribution.

For example, for the light distribution in the horizontal direction, the following quadratics approximately representing the light distribution illustrated in FIG. 11 assumed in the second embodiment are used.

For the range of u=0 to 59, $$H\text{WEIGHT}(u)=1-0.5*(u/59.5)*(u/59.5). \quad \text{Equation (34a)}$$

For the range of u=60 to 119, $$H\text{WEIGHT}(u)=0.5*\{(119-u)/59.5\}*\{(119-u)/59.5\}. \quad \text{Equation (34b)}$$

Similarly, for the light distribution in the vertical direction, the following approximate equations are used.

For the range of v=0 to 59, $$V\text{WEIGHT}(v)=1-0.5*(v/59.5)*(v/59.5). \quad \text{Equation (35a)}$$

For the range of v=60 to 119, $$V\text{WEIGHT}(v)=0.5*\{(119-v)/59.5\}*\{(119-v)/59.5\}. \quad \text{Equation (35b)}$$

The conversion information generator 16e calculates the effect coefficients at the position indicated by the pixel position information by performing calculation of the above Equations (34a), (34b), (35a), and (35b) on the pixel position information, and generates the luminance conversion information and color conversion information by using the calculated effect coefficients.

The conversion information generator 16e includes a luminance conversion information generator 63e and a color conversion information generator 65e. The luminance conversion information generator 63e includes an effect value calculator 631e and a luminance conversion value calculator 632.

The effect value calculator 631e and color conversion information generator 65e calculate, for each of the multiple reference regions, the effect coefficients indicating the degrees of the effects of the illumination light from the reference region at the position indicated by the pixel position information by performing calculation of the above Equations (34a), (34b), (35a), and (35b) on the pixel position information.

In performing calculation of the above Equations (34a), (34b), (35a), and (35b), the effect value calculator 631e and color conversion information generator 65e determine, for each of the multiple reference regions, the relative position (u,v) of the pixel of interest relative to the reference region.

Here, as with the second embodiment, it is assumed that each region is divided into four sections, reference regions that depend on in which of the sections the pixel of interest is located are used, and the position of the pixel of interest is represented by coordinates (s,t) that depend on in which of the sections the pixel of interest is located.

When the pixel of interest is located in the left upper section Sa of the region of interest A(i,j), the position of the pixel of interest is represented by coordinates (s,t) with its origin at the center of the region A(i−1,j−1) located to the left of and above the region of interest A(i,j).

The effect value calculator 631e and color conversion information generator 65e convert the coordinates (x,y) acquired by the pixel position information acquisition unit 14 to coordinates (s,t).

The coordinates (x,y) are converted to the coordinates (s,t), for example, by calculation shown in Equations (18a) and (18b).

The effect value calculator 631e and color conversion information generator 65e determine the relative position (u,v) from the coordinates (s,t) or coordinates (x,y).

The effect value calculator 631e and color conversion information generator 65e determine the effect coefficients HWEIGHT and VWEIGHT for the reference region by performing predetermined calculations on the determined relative position (u,v).

The effect value calculator 631e calculates the luminance effect value BB(x,y) for the pixel of interest by product-sum operations of the effect coefficients HWEIGHT and VWEIGHT determined as above and the light source control values BL(i,j).

In performing the product-sum operations, since HWEIGHT given by Equations (34a) and (34b) is symmetrical with respect to u=59.5, for u in the range of 60 to 119, calculation may be simplified by taking advantage of the relationship of the above Equation (30).

Specifically, by using the relationship of the above Equation (30), the above Equation (19) can be rewritten as the following Equation (36):

$$VB(j-1)=BL(i-1,j-1)*H\text{WEIGHT}(s)+BL(i,j-1)*(1-H\text{WEIGHT}(s)), \quad \text{Equation (36)}$$

and similarly, Equation (20) is rewritten as:

$$VB(j)=BL(i-1,j)*H\text{WEIGHT}(s)+BL(i,j)*(1-H\text{WEIGHT}(s)). \quad \text{Equation (37)}$$

Also, similarly, since VWEIGHT given by the above Equations (35a) and (35b) is symmetrical with respect to v=59.5, for v in the range of 60 to 119, calculation may be simplified by taking advantage of the same relationship as that of the above Equation (30).

Specifically, by using the same relationship as that of the above Equation (30), Equation (21) can be rewritten as the following Equation (38):

$$BB(s,t)=V(j-1)*V\text{WEIGHT}(t)+V(j)*(1-V\text{WEIGHT}(t)). \quad \text{Equation (38)}$$

The effect value calculator 631 determines the luminance effect value BB(s,t) by performing calculation of the above Equations (36), (37), and (38).

A process of obtaining BB(x,y) from BB(s,t) is performed by using the relationship of Equations (18a) and (18b) in the same manner as described above regarding the second embodiment.

The luminance conversion value calculator 632 is the same as the luminance conversion value calculator 632 of FIG. 3, and calculates the luminance conversion value YS(x,y) from the luminance effect value BB(x,y) by calculation of Equation (11).

The calculated luminance conversion value YS(x,y) is supplied as the luminance conversion information to the converter 17.

A process of generation of the color conversion information in the color conversion information generator 65e is performed in the same manner as in the effect value calculator 631e.

The color conversion information generator 65e generates the color conversion information CCR(x,y) and CCB(x,y) at the position of the pixel of interest by product-sum operations of the effect coefficients HWEIGHT and VWEIGHT determined as described above by calculation of Equations (34a), (34b), (35a), and (35b) and the color shift correction amounts, as with the effect value calculator 631e.

However, as with the case of calculation of the luminance effect value, in performing the product-sum operations, since HWEIGHT given by Equations (34a) and (34b) is symmetrical with respect to u=59.5, the relationship of the above Equation (30) may be used.

Specifically, by using the relationship of the above Equation (30), the above Equations (22) to (27) can be rewritten as the following Equations (39) to (44):

$$VCSR(j-1)=CSR(i-1,j-1)*H\text{WEIGHT}(s)+CSR(i,j-1)*(1-H\text{WEIGHT}(s)), \quad \text{Equation (39)}$$

$$VCSR(j)=CSR(i-1,j)*H\text{WEIGHT}(s)+CSR(i,j)*(1-H\text{WEIGHT}(s)), \quad \text{Equation (40)}$$

$$CCR(s,t)=VCSR(j-1)*V\text{WEIGHT}(t)+VCSR(j)*(1-V\text{WEIGHT}(t)), \quad \text{Equation (41)}$$

$$VCSB(j-1)=CSB(i-1,j-1)*H\text{WEIGHT}(s)+CSB(i,j-1)*(1-H\text{WEIGHT}(s)), \quad \text{Equation (42)}$$

$$VCSB(j)=CSB(i-1,j)*H\text{WEIGHT}(s)+CSB(i,j)*(1-H\text{WEIGHT}(s)), \quad \text{Equation (43)}$$

$$CCB(s,t)=VCSB(j-1)*V\text{WEIGHT}(t)+VCSB(j)*(1-V\text{WEIGHT}(t)). \quad \text{Equation (44)}$$

The color conversion information generator 65 performs calculation of the above Equations (39) to (44) to generate the color conversion information CCR(s,t) and CCB(s,t).

A process of obtaining CCR(x,y) and CCB(x,y) from CCR(s,t) and CCB(s,t) is performed by using the relationship of Equations (18a) and (18b) in the same manner as described above regarding the second embodiment.

The color converter 71 uses the color conversion information CCR(x,y) and CCB(x,y) determined as above to perform color conversion on the image signal according to Equations (16R), (16G), and (16B), as with the first embodiment.

The luminance converter 72 uses the luminance conversion information YS(x,y) determined as above to perform luminance conversion on the image signal according to Equations (17R), (17G), and (17B), as with the first embodiment.

In this embodiment, since the color shift information generator 15e that generates the color shift information by calculation is used instead of the color shift information generator 15 including the color shift table storage of the first embodiment, the circuit size can be reduced.

Also, the conversion information generator 16e that calculates the effect coefficients by calculation is used instead of the conversion information generator 16 including the light distribution table storage of the first embodiment, the circuit size can be reduced.

In this embodiment, the color shift information generator 15e may be replaced with the color shift information generator 15 of the first embodiment.

Also, the conversion information generator 16e may be replaced with the conversion information generator 16 of the first embodiment.

This is because the generation of the color shift information and the generation of the conversion information are independent of each other.

Sixth Embodiment

Figure 19:
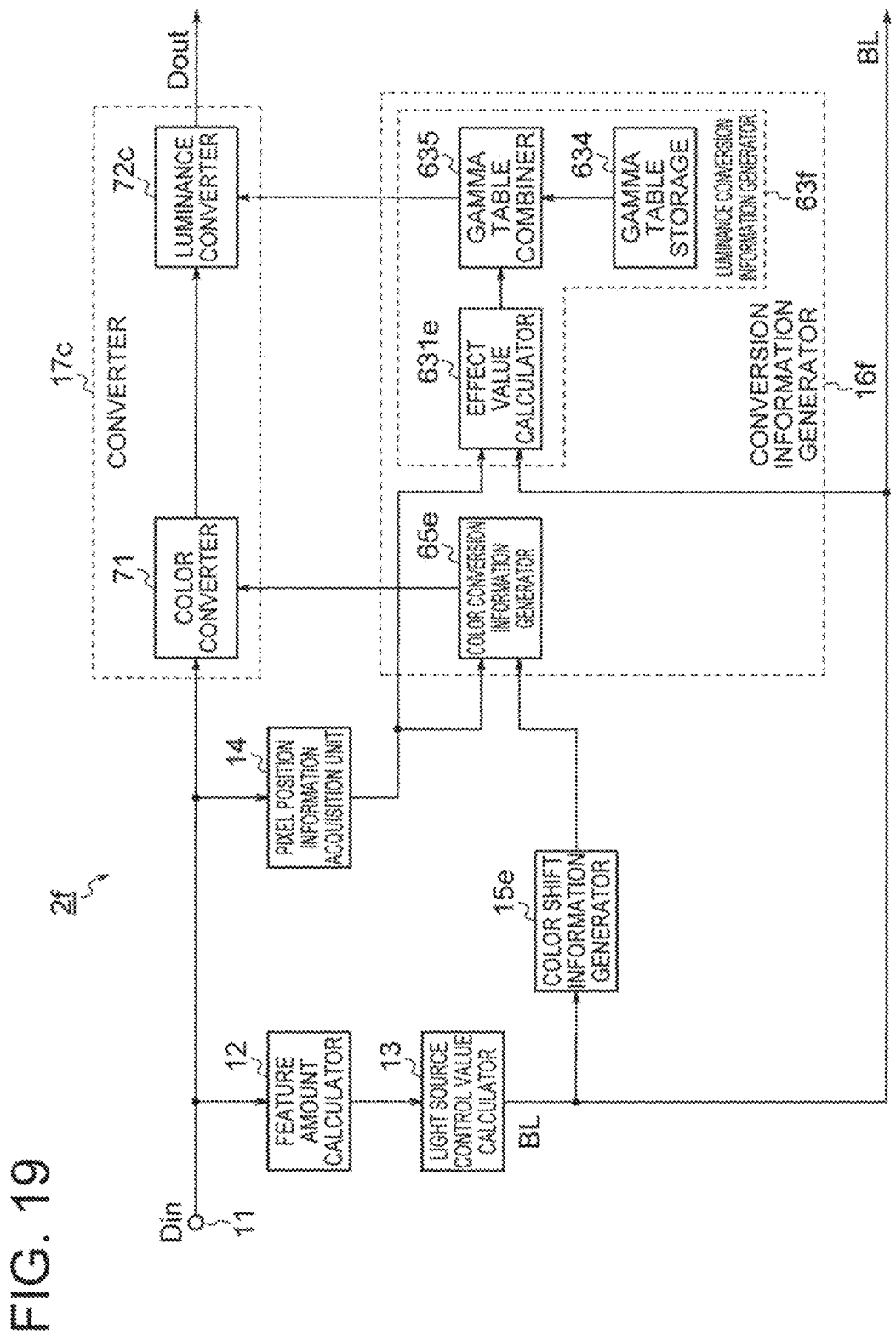
FIG. 19 is a functional block diagram illustrating a configuration of a display control device of a sixth embodiment of the present invention.

FIG. 19 is a functional block diagram illustrating a configuration of a display control device 2f of a sixth embodiment of the present invention.

The display control device 2f of FIG. 19 is generally the same as the display control device 2e of the fifth embodiment illustrated in FIG. 18, but is provided with a conversion information generator 16f instead of the conversion information generator 16e.

The conversion information generator 16f is generally the same as the conversion information generator 16e of FIG. 18, but is provided with a luminance conversion information generator 63f instead of the luminance conversion information generator 63e.

The luminance conversion information generator 63f includes an effect value calculator 631e, a gamma table storage 634, and a gamma table combiner 635.

The effect value calculator 631e is the same as the effect value calculator 631e of FIG. 18, and calculates the luminance effect value BB(x,y) by performing the same calculation as the effect value calculator 631e of FIG. 18 on the basis of the light source control values and pixel position information.

The gamma table storage 634 and gamma table combiner 635 are the same as those described in the third embodiment.

Specifically, the gamma table storage 634 stores the multiple gamma tables GMT(0) to GMT(N).

The gamma table combiner 635 selects, from the multiple gamma tables GMT(0) to GMT(N), two gamma tables GMT(n−1) and GMT(n) whose numbers are adjacent, and combines the selected two gamma tables to generate the combined gamma table GST(x,y). Depending on the situation, one gamma table may be simply output as the combined gamma table.

The color conversion information generator 65e is the same as and operates in the same manner as the color conversion information generator 65e of the fifth embodiment.

The color converter 71 is the same as and performs color conversion in the same manner as the color converter 71 of the first embodiment.

The luminance converter 72c is the same as and performs luminance conversion in the same manner as the luminance converter 72c of the third embodiment.

In the sixth embodiment, as with the third embodiment, by using the gamma tables, it is possible to make tone jump, noise, or the like less noticeable in dark portions of the image, and provide a bright high-contrast image.

Also, as with the fifth embodiment, the generation of the color shift information and the calculation of the effect coefficients can be performed by simple calculation without using the color shift table CST, light distribution table LDT, and the like, and thus the circuit size can be reduced.

The display control devices 2, 2c, 2e, and 2f described in the first to sixth embodiments may be partially or wholly formed by processing circuitry.

For example, the functions of the respective portions of the display control device may be implemented by respective separate processing circuits, or the functions of the portions may be implemented by a single processing circuit.

The processing circuitry may be implemented by hardware, or by software or a programmed computer.

It is possible that a part of the functions of the respective portions of the display control device is implemented by hardware and another part is implemented by software.

Figure 20:
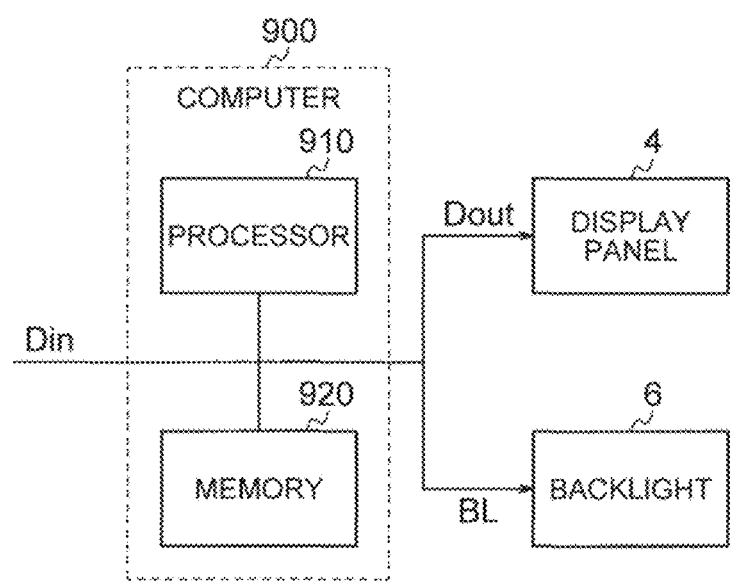
FIG. 20 is a diagram illustrating an example of a computer that implements functions of the display control devices of the first to sixth embodiments, together with a display panel and a backlight.

FIG. 20 illustrates an example of a configuration in the case of implementing all the functions of the display control device 2, 2c, 2e, or 2f of each of the above embodiments with a computer 900 including a single processor, together with the display panel 4 and backlight 6.

In the illustrated example, the computer 900 includes a processor 910 and a memory 920.

A program for implementing the functions of the respective portions of the display control device is stored in the memory 920.

The processor 910 uses, for example, a central processing unit (CPU), a graphics processing unit (GPU), a microprocessor, a microcontroller, a digital signal processor (DSP), or the like.

The memory 920 uses, for example, a semiconductor memory, such as a random access memory (RAM), a read only memory (ROM), a flash memory, an erasable programmable read only memory (EPROM), or an electrically erasable programmable read only memory (EEPROM), a magnetic disk, an optical disk, a magnetic optical disk, or the like.

The processor 910 implements the function of the display control device by executing the program stored in the memory 920.

The function of the display control device includes control of display on the display panel 4 and control of the light emission amounts of the backlight 6, as described above.

A procedure in the case of performing the process of the display control device of the first embodiment with the computer illustrated in FIG. 20 will be described with reference to FIG. 21.

In step ST11, the image signal Din is input.

In step ST12, the feature amount FT(i,j) of each region is calculated for the input image signal Din.

In step ST13, the light source control value BL(i,j) for each region is calculated on the basis of the feature amount FT(i,j) of each region.

In step ST14, the pixel position information is acquired for each pixel.

The process of step ST14 can be performed in parallel with the processes of steps ST12 and ST13.

In step ST15, the color shift information, e.g., the color shift information indicating the color shift correction amounts CSR and CSB, is generated on the basis of the pixel position information and light source control values BL(i,j).

In step ST16, the conversion information is generated on the basis of the pixel position information, light source control values BL(i,j), and color shift information.

The generation of the conversion information includes generation of the luminance conversion information YS(x,y) based on the pixel position information and light source control values, and generation of the color conversion information CCR(x,y) and CCB(x,y) based on the pixel position information and color shift information.

In step ST17, the luminance conversion using the luminance conversion information and the color conversion using the color conversion information are performed on the image signal.

In step ST18, the control of the light emission amount of each region of the backlight based on the light source control values BL(i,j) is performed.

After the process of step ST13 is finished, even before the process of step ST14 is finished, the process of step ST18 may be started, and it is not necessary to wait until the process of step ST14 is finished.

In step ST19, the transmittance of each pixel of the display panel is controlled by using the image signal subjected to the luminance conversion and color conversion.

The generation of the color conversion information and luminance conversion information, and the color conversion and luminance conversion on the input image signal using the generated color conversion information and luminance conversion information are performed for each pixel. Specifically, they are repeated for all the pixels of each frame.

The generation of the light source control value and the control of the backlight based on the light source control value are performed for each region. Specifically, they are performed for each of the regions of the backlight.

The above process is repeated each time an image signal of one frame is input. Thus, it is repeated for image signals input in time series.

Although display control devices of the present invention have been described above, the display control methods implemented by the above display control devices also form part of the present invention. Also, programs for causing computers to execute processes of the above display control devices or display control methods, and computer-readable recording media, e.g., non-transitory recording media, storing the programs also form part of the present invention.

Although embodiments of the present invention have been described, the present invention is not limited to these embodiments.

REFERENCE SIGNS LIST 2, 2c, 2e, 2f display control device, 4 display panel, 6 backlight, 11 image input terminal, 12 feature amount calculator, 13 light source control value calculator, 14 pixel position information acquisition unit, 15, 15e color shift information generator, 16, 16e, 16f conversion information generator, 17, 17c converter, 51 color shift table storage, 53 color shift information reader, 61 light distribution table storage, 63, 63b, 63e, 63f luminance conversion information generator, 65, 65e color conversion information generator, 71 color converter, 72, 72c luminance converter, 631, 631e effect value calculator, 632 luminance conversion value calculator, 634 gamma table storage, 635 gamma table combiner.

The invention claimed is:

1. A display control device of an image display device that includes a display panel having a plurality of pixel positions and configured to display an image by changing a transmittance at each pixel position and a backlight including a plurality of regions, and generates and outputs an output image signal by performing color conversion and luminance conversion on an input image signal while sequentially taking, as a pixel of interest, a plurality of pixels constituting an image represented by the input image signal, the display control device comprising:
processing circuitry
to calculate, from the input image signal, a feature amount for each of the plurality of regions;
to calculate, from the feature amount for each of the plurality of regions, a light source control value for each of the plurality of regions;
to generate, for each of the regions, color shift information for the region on a basis of the light source control value for the region;
to acquire, from the input image signal, pixel position information for the pixel of interest;
to generate luminance conversion information for the pixel of interest, with a region to which the pixel of interest belongs and regions therearound as a plurality of reference regions, from the light source control value for each of the plurality of reference regions, and the pixel position information for the pixel of interest, and generate color conversion information for the pixel of interest from the color shift information for each of the plurality of reference regions and the pixel position information for the pixel of interest; and
to convert, on a basis of the color conversion information and the luminance conversion information for the pixel of interest, a color and a luminance of the input image signal for the pixel of interest to generate the output image signal for the pixel of interest,
wherein for each of the plurality of regions, the color shift information indicates a ratio, or its reciprocal, of a change in an intensity of color of illumination light from the region to a change in the light source control value for the region, and
the color conversion information indicates a color conversion value, and
the processing circuitry multiplies a color component of the input image signal by the color conversion value or its reciprocal to generate a color component of the output image signal, and wherein the display control device
controls, for each of the plurality of regions, a light emission amount of the region on a basis of the light source control value for the region, and
controls a transmittance at a position of the pixel of interest of the display panel by using the output image signal for the pixel of interest.

2. The display control device of claim 1, wherein the processing circuitry
includes a color shift table representing a relationship between the light source control value and the color shift information, and
determines, for each of the plurality of regions, the color shift information for the region by referring to the color shift table with the light source control value for the region.

3. The display control device of claim 1, wherein the processing circuitry generates, for each of the plurality of regions, the color shift information for the region by performing a predetermined calculation on the light source control value for the region.

4. The display control device of claim 1, wherein the processing circuitry
determines, for each of the plurality of reference regions, on a basis of the pixel position information for the pixel of interest, an effect coefficient indicating a degree of an effect of illumination light from the reference region on a brightness at a position of the pixel of interest, and
generates the luminance conversion information and the color conversion information on a basis of the determined effect coefficients.

5. The display control device of claim 4, wherein the processing circuitry
determines a luminance effect value that is a sum of effects of illumination light from the plurality of reference regions, by performing a product-sum operation using the effect coefficient for each of the plurality of reference regions and the light source control value for each of the plurality of reference regions,
calculates a luminance conversion value by performing a predetermined calculation on the luminance effect value, and
outputs the calculated luminance conversion value as the luminance conversion information.

6. The display control device of claim 5, wherein the processing circuitry
uses, as the effect coefficients, first effect coefficients indicating degrees of effects in a first direction of the display panel and second effect coefficients indicating degrees of effects in a second direction of the display panel, and
determines the luminance effect value by performing product-sum operations by using the light source control values for the plurality of reference regions arranged in the first direction at different positions in the second direction and the first effect coefficients, and performing a product-sum operation by using results of the product-sum operations at the different positions in the second direction and the second effect coefficients.

7. The display control device of claim 4, wherein the processing circuitry
determines a luminance effect value that is a sum of effects of illumination light from the plurality of reference regions, by performing a product-sum operation using the effect coefficient for each of the plurality of reference regions and the light source control value for each of the plurality of reference regions, includes a plurality of gamma tables corresponding to different values of the luminance effect value, and selects one or two of the plurality of gamma tables on a basis of the luminance effect value, generates a combined gamma table from the selected gamma tables, and outputs the generated combined gamma table as the luminance conversion information.

8. The display control device of claim 4, wherein the processing circuitry generates the color conversion information for the pixel of interest by performing a product-sum operation by using the effect coefficient for each of the plurality of reference regions and the color shift information for each of the plurality of reference regions.

9. The display control device of claim 8, wherein the processing circuitry uses, as the effect coefficients, first effect coefficients indicating degrees of effects in a first direction of the display panel and second effect coefficients indicating degrees of effects in a second direction of the display panel, and generates the color conversion information by performing product-sum operations by using the color shift information for the plurality of reference regions arranged in the first direction at different positions in the second direction and the first effect coefficients, and performing a product-sum operation by using results of the product-sum operations at the different positions in the second direction and the second effect coefficients.

10. The display control device of claim 4, wherein the processing circuitry includes a light distribution table representing a relationship between a relative position relative to each of the plurality of regions and the effect coefficient, determines, for each of the plurality of reference regions, on a basis of the pixel position information for the pixel of interest, a relative position of the pixel of interest relative to the reference region, and determines the effect coefficient for each of the plurality of reference regions by referring to the light distribution table at the determined relative positions.

11. The display control device of claim 10, wherein the effect coefficient is defined on an assumption that the effect of the illumination light from each of the plurality of regions extends to an outside of the region.

12. The display control device of claim 10, wherein the light distribution table indicates the effect coefficients for table points arranged at intervals greater than a distance between adjacent pixels, and when the pixel of interest is located at a position that does not coincide with any of the table points, the processing circuitry calculates the effect coefficient for the pixel of interest by interpolation using the effect coefficients for the table points.

13. The display control device of claim 4, wherein the processing circuitry determines, for each of the plurality of reference regions, on a basis of the pixel position information for the pixel of interest, a relative position of the pixel of interest relative to the reference region, and determines the effect coefficient for each of the plurality of reference regions by performing a predetermined calculation on the determined relative positions.

14. The display control device of claim 13, wherein a method of calculating the effect coefficients is defined on an assumption that the effect of the illumination light from each of the plurality of regions extends to an outside of the region.

15. The display control device of claim 1, wherein the processing circuitry converts the color of the input image signal for the pixel of interest on a basis of the color conversion information for the pixel of interest and outputs an image signal for the pixel of interest subjected to color conversion, and converts a luminance of the image signal for the pixel of interest subjected to color conversion on a basis of the luminance conversion information for the pixel of interest and outputs the output image signal for the pixel of interest.

16. An image display device comprising:

the display control device of claim 1;
the backlight; and
the display panel.

17. A display control method of an image display device that includes a display panel having a plurality of pixel positions and configured to display an image by changing a transmittance at each pixel position and a backlight including a plurality of regions, and generates and outputs an output image signal by performing color conversion and luminance conversion on an input image signal while sequentially taking, as a pixel of interest, a plurality of pixels constituting an image represented by the input image signal, the display control method comprising:

calculating, from the input image signal, a feature amount for each of the plurality of regions;

calculating, from the feature amount for each of the plurality of regions, a light source control value for each of the plurality of regions;

generating, for each of the regions, color shift information for the region on a basis of the light source control value for the region;

acquiring, from the input image signal, pixel position information for the pixel of interest;

taking a region to which the pixel of interest belongs and regions therearound as a plurality of reference regions;

generating luminance conversion information for the pixel of interest from the light source control value for each of the plurality of reference regions and the pixel position information for the pixel of interest;

generating color conversion information for the pixel of interest from the color shift information for each of the plurality of reference regions and the pixel position information for the pixel of interest;

converting, on a basis of the color conversion information and the luminance conversion information for the pixel of interest, a color and a luminance of the input image signal for the pixel of interest to generate the output image signal for the pixel of interest;

controlling, for each of the plurality of regions, a light emission amount of the region on a basis of the light source control value for the region; and controlling a transmittance at a position of the pixel of interest of the display panel by using the output image signal for the pixel of interest, wherein, for each of the plurality of regions, the color shift information indicates a ratio, or its reciprocal, of a change in an intensity of color of illumination light from the region to a change in the light source control value for the region, and the color conversion information indicates a color conversion value, and a color component of the input image signal is multiplied by the color conversion value or its reciprocal to generate a color component of the output image signal.

18. A non-transitory computer-readable recording medium storing a program for causing a computer to execute a process of the display control method of claim 17.

19. The display control device of claim 7, wherein the processing circuitry uses, as the effect coefficients, first effect coefficients indicating degrees of effects in a first direction of the display panel and second effect coefficients indicating degrees of effects in a second direction of the display panel, and determines the luminance effect value by performing product-sum operations by using the light source control values for the plurality of reference regions arranged in the first direction at different positions in the second direction and the first effect coefficients, and performing a product-sum operation by using results of the product-sum operations at the different positions in the second direction and the second effect coefficients.

20. The display control device of claim 1, wherein the luminance conversion information indicates a luminance conversion value, and the processing circuitry multiplies the input image signal, or the image signal obtained by the color conversion, by the luminance conversion value.

* * * * *